United States Patent
Goto et al.

(10) Patent No.: US 10,244,376 B1
(45) Date of Patent: Mar. 26, 2019

(54) INFORMATION PROCESSING APPARATUS AND METHOD OF DECIDING CORRECTION AMOUNT IN THE INFORMATION PROCESSING APPARATUS

(71) Applicant: CANON KABUSHIKI KAISHA, Tokyo (JP)

(72) Inventors: Hiroaki Goto, Nagareyama (JP); Masaki Kawanishi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/815,281

(22) Filed: Nov. 16, 2017

Related U.S. Application Data

(63) Continuation of application No. 15/405,113, filed on Jan. 12, 2017, now Pat. No. 9,872,132.

(30) Foreign Application Priority Data

Jan. 19, 2016 (JP) .................................. 2016-008288

(51) Int. Cl.
*H04W 4/80* (2018.01)
*H04N 1/32* (2006.01)
(Continued)

(52) U.S. Cl.
CPC .............. *H04W 4/80* (2018.02); *H04B 17/27* (2015.01); *H04N 1/00307* (2013.01);
(Continued)

(58) Field of Classification Search
CPC ...... H04W 4/80; H04N 1/32021; H04B 17/27
(Continued)

(56) References Cited

U.S. PATENT DOCUMENTS

| 4,506,220 A | 3/1985 | Sawada et al. ................ 324/252 |
| 2014/0342671 A1* | 11/2014 | Kim ........................ H04W 4/02 455/41.3 |

(Continued)

FOREIGN PATENT DOCUMENTS

| CN | 1830163 | 9/2006 |
| CN | 102833848 | 12/2012 |

(Continued)

OTHER PUBLICATIONS

European Search Report dated May 29, 2017 in European Application No. 16207045.2.

(Continued)

*Primary Examiner* — Ayodeji O Ayotunde
(74) *Attorney, Agent, or Firm* — Venable LLP

(57) ABSTRACT

The present invention provides an information processing apparatus and a method of deciding a correction amount for correcting the radio field intensity of received radio waves in the information processing apparatus. The information processing apparatus receives a BLE (Bluetooth Low Energy) packet transmitted by an external apparatus, and displays a screen for deciding a correction amount for correcting the radio field intensity of the BLE packet. If a user inputs an instruction for deciding the correction amount via this screen, the correction amount is decided based on the radio field intensity of the received BLE packet and a reference value.

24 Claims, 17 Drawing Sheets

(51) Int. Cl.
  *H04N 1/00* (2006.01)
  *H04B 17/27* (2015.01)

(52) U.S. Cl.
  CPC .......... *H04N 1/32021* (2013.01); *H04N 1/00* (2013.01); *H04N 2201/006* (2013.01); *H04N 2201/0041* (2013.01); *H04N 2201/0055* (2013.01); *H04N 2201/0082* (2013.01)

(58) Field of Classification Search
  USPC .............................................. 455/41.1, 41.2
  See application file for complete search history.

(56) References Cited

U.S. PATENT DOCUMENTS

| | | | | |
|---|---|---|---|---|
| 2014/0375428 A1* | 12/2014 | Park | .................. | G06K 7/10237 |
| | | | | 340/10.1 |
| 2015/0271628 A1* | 9/2015 | Knaappila | ............... | H04W 4/80 |
| | | | | 455/41.2 |
| 2016/0232515 A1 | 8/2016 | Jhas et al. | .......... | G06Q 20/3224 |
| 2016/0360477 A1 | 12/2016 | Saeki et al. | ........... | H04W 48/18 |
| 2017/0039012 A1* | 2/2017 | Minegishi | ............. | G06F 3/1222 |
| 2017/0134606 A1 | 5/2017 | Kim et al. | ......... | H04N 1/32117 |

FOREIGN PATENT DOCUMENTS

| | | |
|---|---|---|
| JP | 2013-110498 | 6/2013 |
| JP | 2015-070585 | 4/2015 |
| KR | 10-2016-0003457 | 1/2016 |
| WO | 2015/039254 | 3/2015 |
| WO | 2015/156014 | 10/2015 |
| WO | 2016/003108 | 1/2016 |

OTHER PUBLICATIONS

Chinese Office Action dated Jul. 30, 2018 during the prosecution of related Chinese application No. 201710028351.7 (Whole English-language translation included.).

* cited by examiner

FIG. 9

| DISTANCE | 0.1m | 0.18m | 0.30m | 0.56m | 1m | 1.8m | 3.3m | 5.6m | 10m |
|---|---|---|---|---|---|---|---|---|---|
| MOBILE TERMINAL A | -28 | -33 | -38 | -42 | -47 | -53 | -56 | -61 | -61 |
| MOBILE TERMINAL B | -29 | -38 | -41 | -46 | -50 | -52 | -55 | -64 | -58 |

FIG. 10

| DISTANCE | 0.1m | 0.18m | 0.30m | 0.56m | 1m | 1.8m | 3.3m | 5.6m | 10m |
|---|---|---|---|---|---|---|---|---|---|
| REFERENCE RADIO FIELD INTENSITY | -33 | -42 | -46 | -49 | -54 | -56 | -61 | -64 | -65 |

2200 — DEVICE NAME: DeviceA
2201 — MAC ADDRESS: XX-XX-XX-XX-XX-XX
2202 — IP ADDRESS: YYY.YYY.YYY.YYY
2203 — DATE/TIME: 2015/06/26 16:21

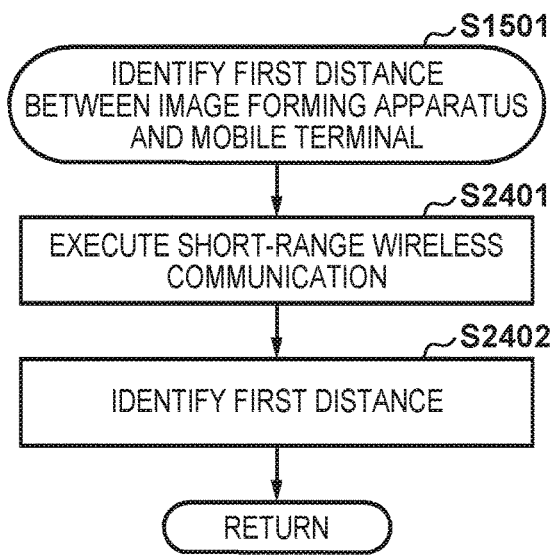
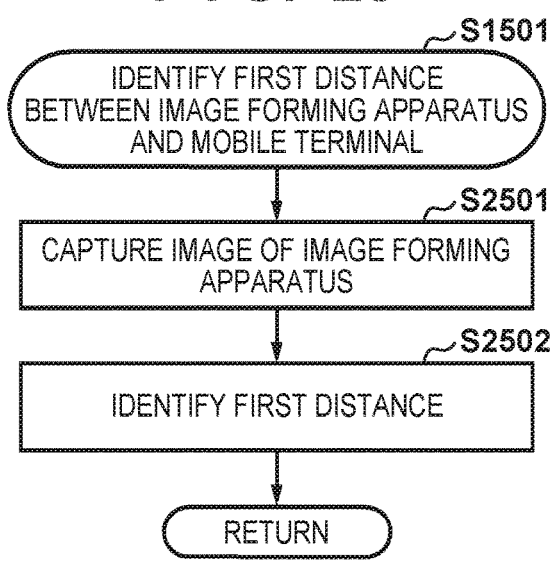

INFORMATION PROCESSING APPARATUS AND METHOD OF DECIDING CORRECTION AMOUNT IN THE INFORMATION PROCESSING APPARATUS

This application is a continuation of U.S. patent application Ser. No. 15/405,113 filed Jan. 12, 2017, currently pending; and claims priority under 35 U.S.C. § 119 to Japanese Application 2016-008288 filed in Japan on Jan. 19, 2016; and the contents of all of which are incorporated herein by reference as if set forth in full.

BACKGROUND OF THE INVENTION

Field of the Invention

The present invention relates to an information processing apparatus and a method of deciding a correction amount in the information processing apparatus.

Description of the Related Art

When identifying the distance between information processing apparatuses (e.g., an image forming apparatus and a mobile terminal) and providing various services (functions) according to the distance, it is very important to accurately identify the distance between the apparatuses. For example, when the distance between two apparatuses decreases, that is to say when a user in possession of a mobile terminal approaches an image forming apparatus, it is possible to save the user the trouble of performing a login operation by detecting that the distance decreased and then automatically performing processing for logging in to the image forming apparatus from the mobile terminal. When the distance between the apparatuses increases, that is to say when the user in possession of the mobile terminal moves away from the image forming apparatus, the mobile terminal is automatically logged out of the image forming apparatus. This makes it possible to prevent a situation in which another user cannot operate the image forming apparatus because the logged-in user remains logged in to the image forming apparatus even though the logged-in user has moved away from the image forming apparatus.

In this case, if the mobile terminal has a wireless communication function, the distance between the image forming apparatus and the mobile terminal can be identified by measuring the intensity of wireless communication radio waves. For example, consider the case where the mobile terminal supports Bluetooth (registered trademark) Low Energy (BLE), the image forming apparatus emits BLE radio waves, and the mobile terminal receives those radio waves. The wireless radio field intensity is stronger the smaller the distance is, and is weaker the greater the distance is, and therefore the distance can be identified to a certain extent by measuring the radio field intensity. For example, Japanese Patent Laid-Open No. 2015-70585 discloses technology in which a mobile terminal receives radio waves output by a wireless radio wave emission source, and the distance to the emission source is calculated based on the intensity of the received radio waves.

However, there is a problem in that the intensity of the radio waves received by the mobile terminal varies depending on the mobile terminal that is being used, and therefore the distance cannot be identified accurately. For example, in the case of measuring the distance with use of near field wireless communication such as BLE, the radio field intensity varies a large amount depending on the position of the BLE chip in the image forming apparatus and the position of the mobile terminal, and therefore there is a risk of not being able to accurately identify the distance. In one specific example, even if the intensity of radio waves received by the mobile terminal is −50 dBm, the distance to the image forming apparatus is 50 cm in some cases and 1 m in other cases. Also, even with the same model of mobile terminal, the intensity of received radio waves varies depending on the presence or absence of an accessory (e.g., a cover attached to the mobile terminal).

SUMMARY OF THE INVENTION

An aspect of the present invention is to eliminate the above-mentioned problems with the conventional techniques.

A feature of the present invention is to provide a technique for reducing variation in the intensity of received radio waves by obtaining an appropriate correction value.

According to a first aspect of the present invention, there is provided a method of deciding a correction amount for correcting a radio field intensity of a BLE (Bluetooth Low Energy) packet received by an information processing apparatus, the method comprising: displaying a screen for deciding the correction amount; and deciding the correction amount based on the radio field intensity of the BLE packet received by the information processing apparatus and a reference value, in a case that an instruction for deciding the correction amount is received from a user via the screen.

According to a second aspect of the present invention, there is provided a method of deciding a correction amount for correcting a radio field intensity of a BLE (Bluetooth Low Energy) packet received by an information processing apparatus, the method comprising: displaying a screen that includes an adjustment object for deciding the correction amount; and deciding the correction amount based on a user operation performed on the adjustment object.

According to a third aspect of the present invention, there is provided an information processing apparatus comprising: a memory device that stores a set of instructions; at least one processor that executes the instructions to: receive a BLE (Bluetooth Low Energy) packet transmitted by an external apparatus; display a screen for deciding a correction amount for correcting a radio field intensity of the BLE packet; and decide the correction amount based on the radio field intensity of the received BLE packet and a reference value, in a case that an instruction for deciding the correction amount is received from a user via the screen.

According to a fourth aspect of the present invention, there is provided an information processing apparatus comprising: a memory device that stores a set of instructions; at least one processor that executes the instructions to receive a BLE (Bluetooth Low Energy) packet transmitted by an external apparatus; display a screen that includes an adjustment object for deciding a correction amount for correcting a radio field intensity of the BLE packet; and decide the correction amount based on a user operation performed on the adjustment object.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a diagram for describing an example of radio field intensities and distances between the mobile terminal and the image forming apparatus according to the first embodiment.

FIG. 10 is a diagram for describing the relationship between radio field intensity and a reference distance serving as a reference for correcting the distance between the mobile terminal and the image forming apparatus.

FIG. 24 is a flowchart for describing processing in which a mobile terminal according to a seventh embodiment identifies a first distance in step S1501 of FIG. 15 mentioned above.

FIG. 25 is a flowchart for describing processing in which a mobile terminal according to an eighth embodiment identifies a first distance in step S1501 of FIG. 15 mentioned above.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
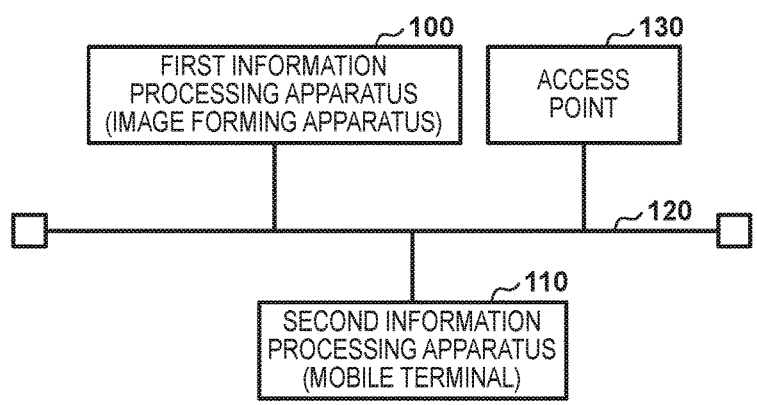
FIG. 1 is a diagram schematically showing a configuration of a communication system that includes a first information processing apparatus and a second information processing apparatus according to a first embodiment of the present invention.

FIG. 1 is a diagram schematically showing the configuration of a communication system that includes a first information processing apparatus and a second information processing apparatus according to a first embodiment of the present invention.

The first embodiment describes an example in which the first information processing apparatus is an image forming apparatus and the second information processing apparatus is a mobile terminal. An access point 130 is connected to a network 120, and a first information processing apparatus (referred to hereinafter as an image forming apparatus) 100 and a second information processing apparatus (referred to hereinafter as a mobile terminal) 110 can communicate with each other via the network 120. If the image forming apparatus 100 and the mobile terminal 110 include a direct wireless communication function, the image forming apparatus 100 and the mobile terminal 110 can directly communicate wirelessly with each other without involvement of the network 120. The mobile terminal 110 transmits print data to the image forming apparatus 100 wirelessly or via the network 120, and the image forming apparatus 100 interprets the received print data and executes print processing.

Figure 2:
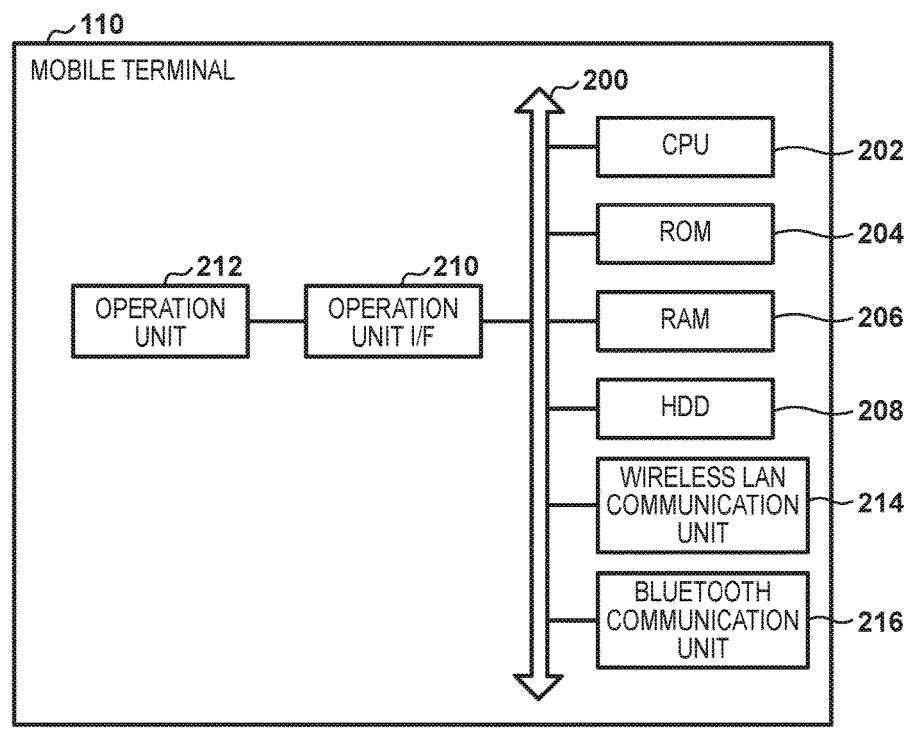
FIG. 2 is a block diagram for describing a configuration of a mobile terminal according to the first embodiment.

FIG. 2 is a block diagram for describing the configuration of the mobile terminal 110 according to the first embodiment.

A CPU 202 controls operations of the mobile terminal 110 by reading out and executing a control program that is stored in a ROM 204, and is also connected to other units via a bus 200. The ROM 204 stores the control program that is executed by the CPU 202. A RAM 206 is used as a work area and a main memory for the CPU 202. A HDD (hard disk drive) 208 stores various types of data such as image data. An operation unit I/F 210 is connected to an operation unit 212 and the bus 200. The operation unit 212 includes a display unit, which has a touch panel function, and a software keyboard and hardware keys, and displays various screens and receives user operations. A user can input various types of instructions and information to the mobile terminal 110 via the operation unit 212. A wireless LAN communication unit 214 executes wireless communication with an external apparatus such as the access point 130. A Bluetooth (registered trademark) communication unit 216 executes Bluetooth wireless communication with an external apparatus such as the image forming apparatus 100.

Figure 3:
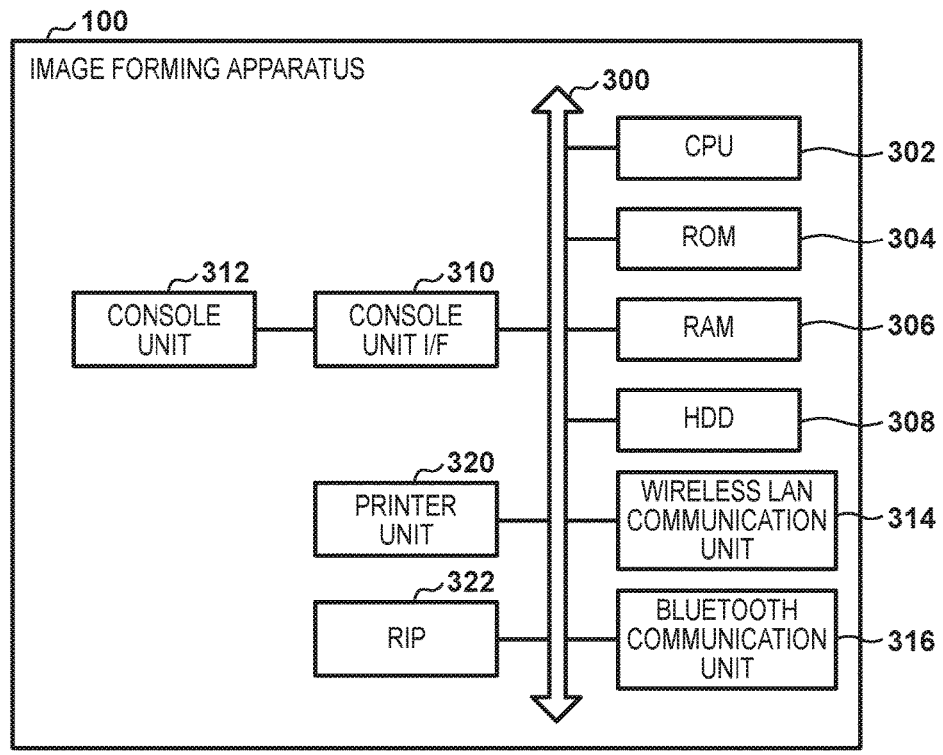
FIG. 3 is a block diagram for describing a configuration of an image forming apparatus according to the first embodiment.

FIG. 3 is a block diagram for describing the configuration of the image forming apparatus 100 according to the first embodiment.

A CPU 302 controls operations of the image forming apparatus 100 by executing a boot program stored in a ROM 304, deploying a program stored in an HDD (Hard Disk Drive) 308 to a RAM 306, and then executing the program. The CPU 302 is connected to other units via a bus 300. The ROM 304 stores the boot program, various types of data, and the like. The RAM 306 is used as a main memory for the CPU 302 and as a temporary storage area such as a work area. The HDD 308 stores programs and various types of data such as image data. A console unit I/F 310 is connected to a console unit 312 and the bus 300. The console unit 312 includes a display unit, which has a touch panel function, and a software keyboard and hardware keys, and displays various screens and receives user operations. A user can input various types of instructions and information to the image forming apparatus 100 via the console unit 312. A wireless LAN communication unit 314 executes wireless communication with an external apparatus such as the access point 130. A Bluetooth communication unit 316 executes Bluetooth wireless communication with an external apparatus such as the access point 130. A printer unit 320 prints an image on a storage medium (sheet) based on bitmap image data generated by an RIP (Rendering Image Processor) 322. The RIP 322 performs rendering processing based on rendering information and generates bitmap image data.

The first embodiment will be described in detail below. In the first embodiment, the mobile terminal 110 calculates a radio field intensity correction value based on wireless communication radio waves transmitted from the image forming apparatus 100. When calculating this correction value, the user is presented with a model-specific correction screen for each apparatus that is emitting radio waves in order to obtain an accurate correction value. Thereafter, in the case of identifying the distance to the image forming apparatus 100 at the location to where the mobile terminal moved, the intensity of radio waves received at that location is corrected based on the correction value, and the distance to the image forming apparatus 100 is calculated using the corrected radio field intensity. This processing is provided as, for example, a piece of application software (not shown) that is installed in the image forming apparatus 100 and the mobile terminal 110. When providing various types of services (functions) according to the distance between these two devices, it is necessary to accurately identify the distance between the mobile terminal 110 and the image forming apparatus 100.

Figure 4:
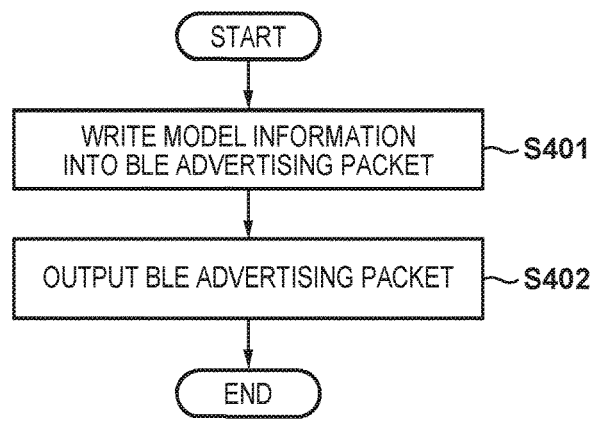
FIG. 4 is a flowchart for describing processing in which the image forming apparatus according to the first embodiment writes model information into a BLE advertising packet and transmits the advertising packet.

FIG. 4 is a flowchart for describing processing in which the image forming apparatus 100 according to the first embodiment writes model information into a BLE (Bluetooth Low Energy) advertising packet and transmits the advertising packet. A program for executing this processing is stored in the HDD 308, and the processing shown in this flowchart is achieved by the CPU 302 deploying the program to the RAM 306 and executing it.

First, in step S401, the CPU 302 writes model information of the image forming apparatus 100 into a BLE advertising packet that is to be transmitted by the Bluetooth communication unit 316. This model information includes, for example, a model number that is assigned for each model. Next, the procedure moves to step S402, in which the CPU 302 causes the Bluetooth communication unit 316 to transmit the BLE advertising packet into which the model information was written in step S401. This advertising packet also includes a MAC address indicating the transmission source of the advertising packet.

Accordingly, the mobile terminal 110 that receives this advertising packet can identify what type of apparatus transmitted the BLE advertising packet.

Figure 5:
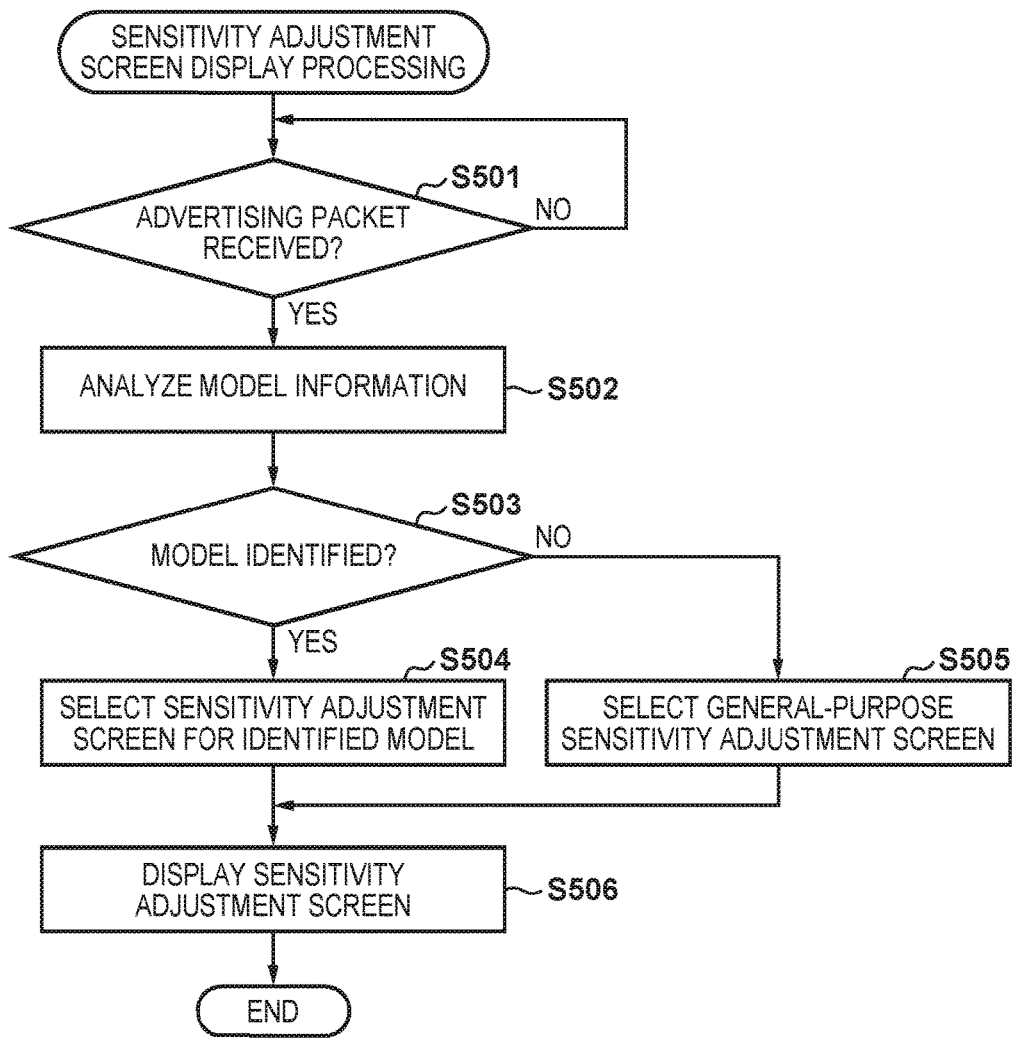
FIG. 5 is a flowchart for describing processing in which the mobile terminal according to the first embodiment displays a sensitivity adjustment screen that corresponds to the model of the image forming apparatus based on a received BLE advertising packet.

FIG. 5 is a flowchart for describing processing in which the mobile terminal 110 according to the first embodiment displays a sensitivity adjustment screen that corresponds to the model of the image forming apparatus 100 based on a received BLE advertising packet. This processing is realized by the CPU 202 deploying a program stored in the ROM 204 to the RAM 206 and executing the program.

The processing shown in this flowchart is started due to the mobile terminal 110 receiving an advertising packet from an image forming apparatus.

Figure 6:
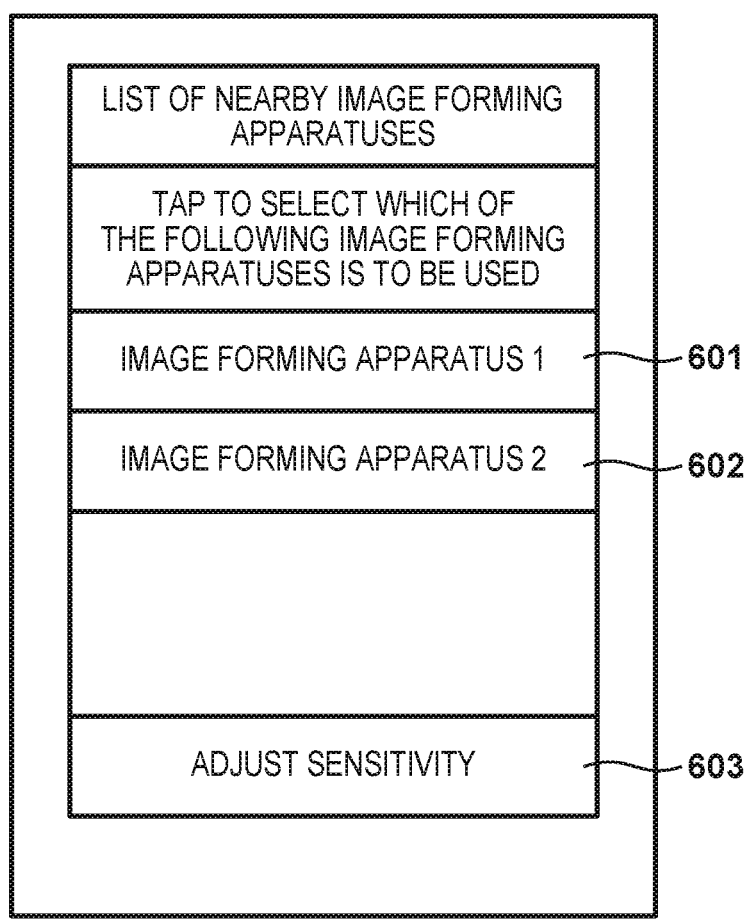
FIG. 6 depicts a view illustrating an example of a screen that is displayed on an operation unit of the mobile terminal according to the first embodiment and shows a list of image forming apparatuses detected by the mobile terminal.

FIG. 6 depicts a view showing an example of a screen that is displayed on the operation unit 212 of the mobile terminal 110 according to the first embodiment and shows a list of image forming apparatuses detected by the mobile terminal 110. FIG. 6 shows an example of a list of image forming apparatuses that transmitted advertising packets received by the mobile terminal 110, and shows a state in which advertising packets have been received from an image forming apparatus 1 and an image forming apparatus 2.

First, in step S501, the CPU 202 determines whether or not a BLE advertising packet transmitted by an image forming apparatus has been received. The procedure moves to step S502 if it is determined that advertising packet has been received, or moves to step S501 if otherwise. In step S502, the CPU 202 obtains and analyzes the model information included in the BLE advertising packet that was received in step S501, stores the result of the analysis in the RAM 206, and then the procedure moves to step S503. Here, if multiple advertising packets have been received, the model information included in the advertising packet having the highest radio field intensity is obtained and analyzed.

In step S503, the CPU 202 compares the model information that was stored in the RAM 206 in step S502 with model information that has been stored in the HDD 208 in advance, and determines that the model has been identified and the procedure moves to step S504 if a match is found, or moves to step S505 if otherwise. In step S504, the CPU 202 reads out, from the HDD 208, image data that is necessary for displaying a sensitivity adjustment screen that corresponds to the model identified in step S503, writes the image data to the RAM 206, and then the procedure moves to step S506. In step S505, the CPU 202 reads out, from the HDD 208, general-purpose image data for displaying a sensitivity adjustment screen, writes the image data to the RAM 206, and then the procedure moves to step S506. In step S506, the CPU 202 displays a sensitivity adjustment screen on the operation unit 212 using the image data that was stored in the RAM 206 in step S504 or step S505.

Figure 7A:
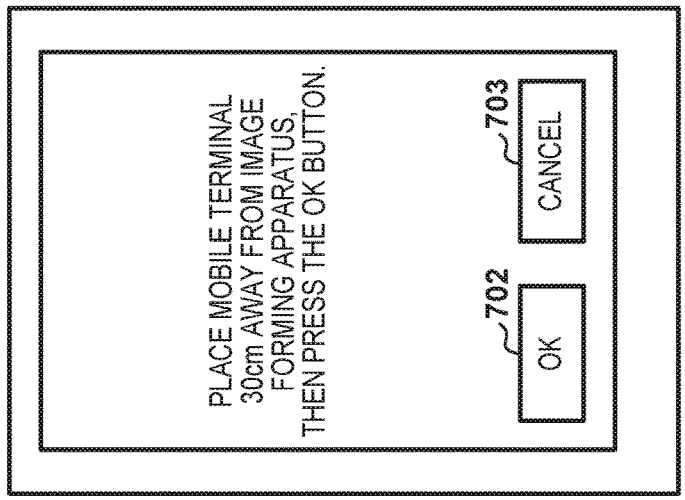
FIGS. 7A to 7C depict views showing examples of sensitivity adjustment screens displayed on the operation unit of the mobile terminal according to the first embodiment.
Figure 7B:
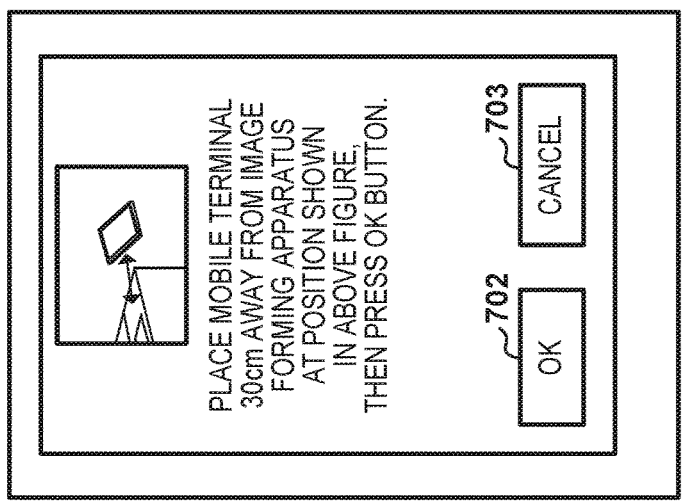
Figure 7C:
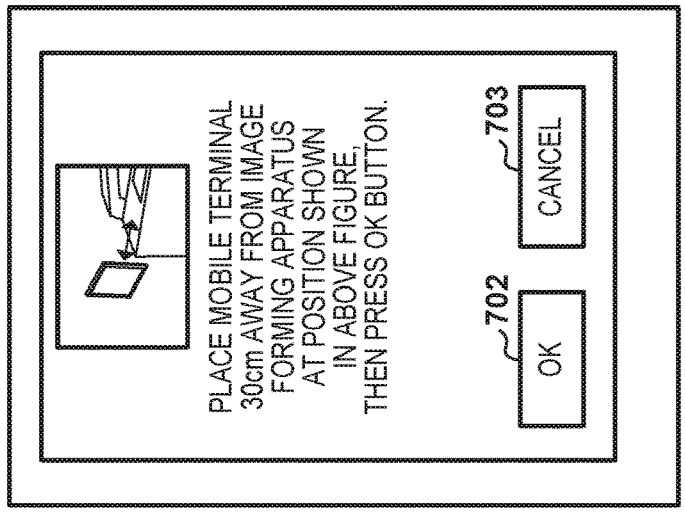

FIGS. 7A to 7C are diagrams showing examples of sensitivity adjustment screens displayed on the operation unit 212 of the mobile terminal 110 according to the first embodiment.

FIGS. 7A and 7B depict views illustrating display examples in which image forming apparatus models have been identified, and an image forming apparatus has been selected and an adjust sensitivity button 603 has been pressed in FIG. 6, and therefore a screen is displayed based on the image data that was read out from the HDD 208 and written to the RAM 206 in step S504. FIG. 7A shows an instruction screen for an image forming apparatus 100 that corresponds to a model A. This image forming apparatus 100 has a BLE chip on the left side of the console unit 312, and instructs the user to bring the mobile terminal close to the left side of the console unit 312.

On the other hand, FIG. 7B shows an instruction screen for an image forming apparatus 100 that corresponds to a model B. In this case of this image forming apparatus 100, the instruction screen instructs the user to bring the mobile terminal close to the right side of the console unit 312. These images correspond to the model of the image forming apparatus that was identified in step S503, and instruct the user to perform calibration while referencing the displayed image. If the user performs the operation designated on the screen and then presses an OK button 702, the CPU 202 determines that the radio field intensity at the time of reception of the BLE advertising packet corresponds to a distance of 30 cm. If a cancel button 703 is pressed, the CPU 202 recognizes that distance determination processing has been canceled. FIG. 7C shows an example of an instruction screen that is displayed if the model was not identified in step S503, and in this case, a general-purpose calibration method for a general image forming apparatus is presented to the user.

In this way, the sensitivity adjustment screen image that is to be displayed according to the pressing of the adjust sensitivity button 603, which is for giving an instruction to calculate a correction value, is switched according to the model of the image forming apparatus that transmitted the BLE advertising packet. In this way, even if the BLE chip installation location changes depending on the model of the image forming apparatus, by indicating the positional relationship of the image forming apparatus and the BLE chip, the user can perform distance calibration appropriately. Specifically, as shown in FIG. 7A for example, it is possible to guide the user to position the mobile terminal 110 at a predetermined distance (30 cm in the example in FIG. 7A) from the BLE chip and perform distance calibration.

In the first embodiment, the sensitivity adjustment image is switched according to the model of the image forming apparatus as shown in FIGS. 7A to 7C for example, but distance information corresponding to the model may be displayed in step S504 or step S505. Also, instead of switching the screen according to the model of the image forming apparatus, a configuration is possible in which models with the same BLE chip installation location are grouped together, and the screen is switched according to the group. Moreover, although the first embodiment describes an example in which the sensitivity adjustment screen for correcting the radio field intensity is switched according to the model information, an operation screen for performing a specific operation may be switched according to the model information.

Figure 8:
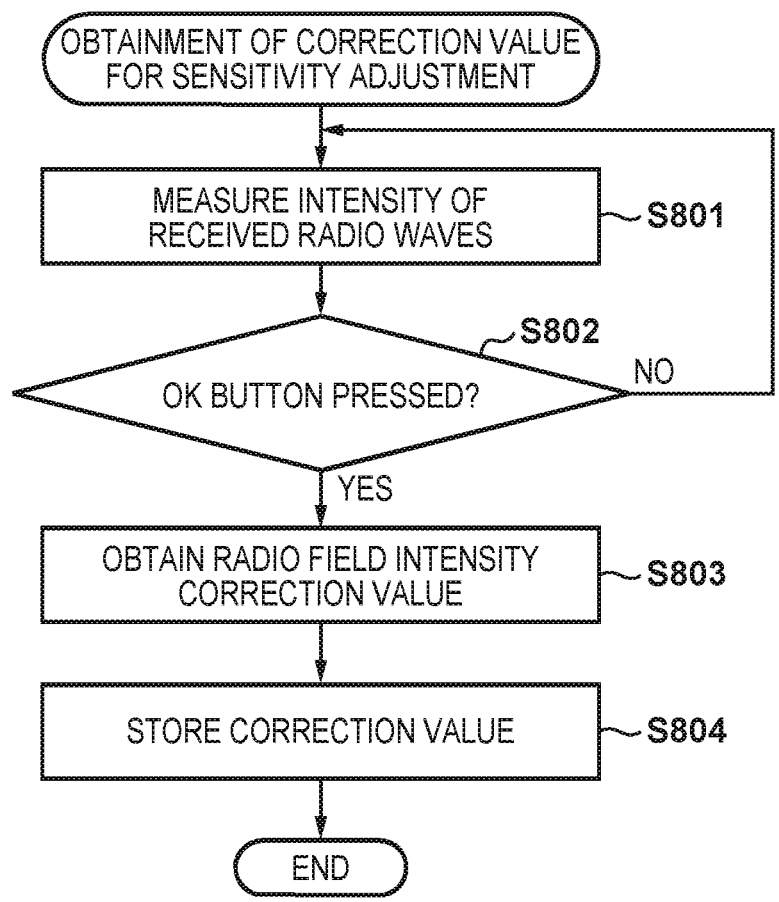
FIG. 8 is a flowchart for describing processing for performing sensitivity adjustment (radio field intensity correction value calculation) in the mobile terminal according to the first embodiment.

FIG. 8 is a flowchart for describing processing for performing sensitivity adjustment (radio field intensity correction value calculation) in the mobile terminal 110 according to the first embodiment. This processing is realized by the CPU 202 deploying a program stored in the ROM 204 to the RAM 206 and executing the program.

First, in step S801, the CPU 202 measures a received signal strength indicator (RSSI) of the BLE advertising packet that was received via the Bluetooth communication unit 216. Next, the procedure moves to step S802, in which the CPU 202 stores the content of the received packet in the RAM 206, and then the CPU 202 determines whether or not the OK button 702 in the sensitivity adjustment screen (FIGS. 7A to 7C) has been pressed. The procedures moves to step S803 if it was determined that the OK button 702 was pressed, or moves to step S801 if otherwise.

FIG. 9 is a diagram for describing an example of radio field intensities and distances between the mobile terminal 110 and the image forming apparatus 100 according to the first embodiment.

Here, reference numeral 900 denotes the case of a mobile terminal A, which is the same as the mobile terminal 110. Also, reference numeral 901 denotes the case of a mobile terminal B, which corresponds to a mobile terminal that is not shown in the drawings. The distance is the distance between the mobile terminal and the image forming apparatus 100. Radio field intensities 903 are radio field intensities measured by the mobile terminal A, and radio field intensities 904 are radio field intensities measured by the mobile terminal B. Note that the radio field intensity is shown in units of dBm.

FIG. 10 is a diagram for describing the relationship between radio field intensity and a reference distance serving as a reference for correcting the aforementioned distances. This figure shows a reference relationship between distance and the reference radio field intensity.

In step S803, the CPU 202 obtains a radio field intensity correction value. In the first embodiment, the correction value is calculated using (30 cm)/(−46 dBm) in FIG. 10 as a reference. In the example in FIG. 9, the radio field intensity is −38 dBm at 30 cm, and therefore the correction value is the difference therebetween, that is to say (−46 dBm)−(−38 dBm)=(−8 dBm). Next, the procedure moves to step S804, in which the CPU 202 stores the correction value that was calculated in step S803 in the RAM 206, and then ends this processing. At this time, the CPU 202 may store the correction value in association with the model of the image forming apparatus that was identified.

Also, in the first embodiment, the radio field intensity of the received BLE advertising packet is used as-is when calculating the correction value, but a configuration is possible in which multiple radio field intensities are stored, the average value of them is obtained, and the correction value is calculated based on the average value.

Figure 11:
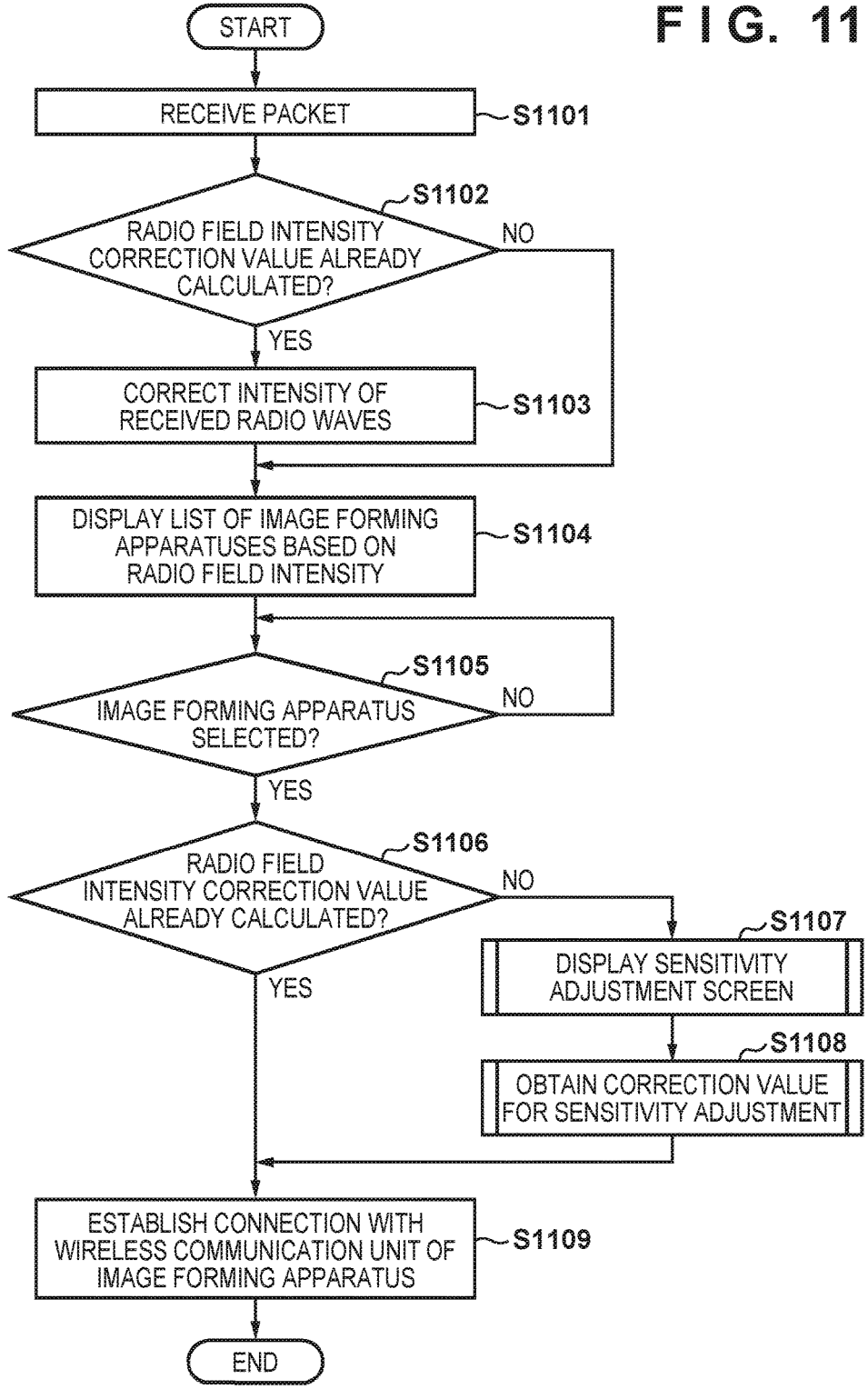
FIG. 11 is a flowchart for describing processing in which the mobile terminal according to the first embodiment establishes a Wi-Fi connection with the image forming apparatus based on a calculated correction value and the radio field intensity of a received BLE advertising packet.

FIG. 11 is a flowchart for describing processing in which the mobile terminal 110 according to the first embodiment establishes a Wi-Fi connection with the image forming apparatus 100 based on a calculated correction value and the radio field intensity of a received BLE advertising packet. This processing is realized by the CPU 202 deploying a program stored in the ROM 204 to the RAM 206 and executing the program.

First, in step S1101, the CPU 202 receives a BLE advertising packet via the Bluetooth communication unit 216. If multiple image forming apparatuses are outputting BLE radio waves, multiple advertising packets are received. The CPU 202 stores the content of the received packet in the RAM 206. In the first embodiment, the description will be continued based on the premise that the radio field intensity of the received radio waves is −46 dBm. Next, the procedure moves to step S1102, in which the CPU 202 determines whether or not the previously described correction value is stored in the RAM 206. The procedure moves to step S1103 if it is determined that the correction value is stored, or moves to step S1104 if otherwise. In step S1103, the CPU 202 corrects the radio field intensity of the radio waves received in step S1101 with use of the correction value stored in the RAM 206, and then the procedure moves to step S1104. In step S1104, the CPU 202 displays a screen including a list of image forming apparatuses as shown in previously described FIG. 6. This list of image forming apparatuses screen displays a list of image forming apparatuses from which advertising packets were received in step S1101. Here, a configuration is possible in which the image forming apparatuses that are displayed are only the image forming apparatuses for which the radio field intensity of radio waves received in step S1101 or the radio field intensity that was corrected in step S1103 is greater than or equal to a predetermined threshold value, and the image forming apparatuses for which the radio field intensity is below the predetermined threshold value are not displayed in the list screen. Accordingly, it is possible to display a screen including a list of image forming apparatuses for which the radio field intensity is greater than or equal to a predetermined threshold value, or in other words, image forming apparatuses that are near the mobile terminal 110.

Next, the procedure moves to step S1105, in which the CPU 202 determines whether or not an image forming apparatus has been selected from the list of image forming apparatuses by pressing either the button 601 or 602 in FIG. 6. The procedure moves to step S1106 if an image forming apparatus has been selected, or moves to step S1105 if otherwise. In step S1106, similarly to previously described step S1102, the CPU 202 determines whether or not a correction value for correcting the sensitivity is stored in the RAM 206. The procedure moves to step S1109 if it is determined that the correction value is stored, or moves to step S1107 if otherwise. In step S1107, the CPU 202 executes the sensitivity adjustment screen display processing shown in FIG. 5. The procedure then moves to step S1108, in which the CPU 202 executes the processing for obtaining a correction value for sensitivity adjustment shown in FIG. 8. Note that if correction values are stored in association with image forming apparatus models in previously described step S803, the CPU 202 may determine in step S1106 whether or not a correction value for the image forming apparatus selected from the list is stored.

In the first embodiment, the radio field intensity of radio waves received in step S1101 is −46 dBm, and the correction value stored in step S804 in FIG. 8 is −8 dBm, and therefore the corrected radio field intensity is (−46 dBm)+(−8 dBm) =(−54 dBm). In this case, it is determined that the distance between the mobile terminal 110 and the image forming apparatus 100 is approximately 1 m according to FIG. 10.

The procedure then moves to step S1109, in which the CPU 202 performs GATT communication with the image forming apparatus selected by the user in step S1105, obtains an SSID and an encryption key, and establishes a connection with the wireless LAN communication unit 314 of the image forming apparatus.

In the first embodiment, the image forming apparatus transmits model information, the mobile terminal 110 receives the model information and identifies the model of the image forming apparatus. However, a configuration is possible in which image forming apparatuses having the same BLE chip installation location are placed in the same category, the image forming apparatus transmits corresponding category information, and the mobile terminal that receives it switches the screen according to the category information.

As described above, according to the first embodiment, by switching the sensitivity adjustment screen according to the model of the image forming apparatus and causing the user of the mobile terminal to perform an operation for distance calibration, it is possible to correct a difference between the radio field intensity and the actual distance and accurately obtain the distance to the image forming apparatus.

Second Embodiment

Next, a second embodiment according to the present invention will be described. Note that the system configuration and the configurations of the image forming apparatus and the mobile terminal in the second embodiment are similar to the configurations of the first embodiment described above, and therefore will not be described. In the second embodiment, when the previously described correction value is calculated by the mobile terminal 110, the user is allowed to select whether or not to perform correction, and select the extent of correction that is to be performed.

Figure 12:
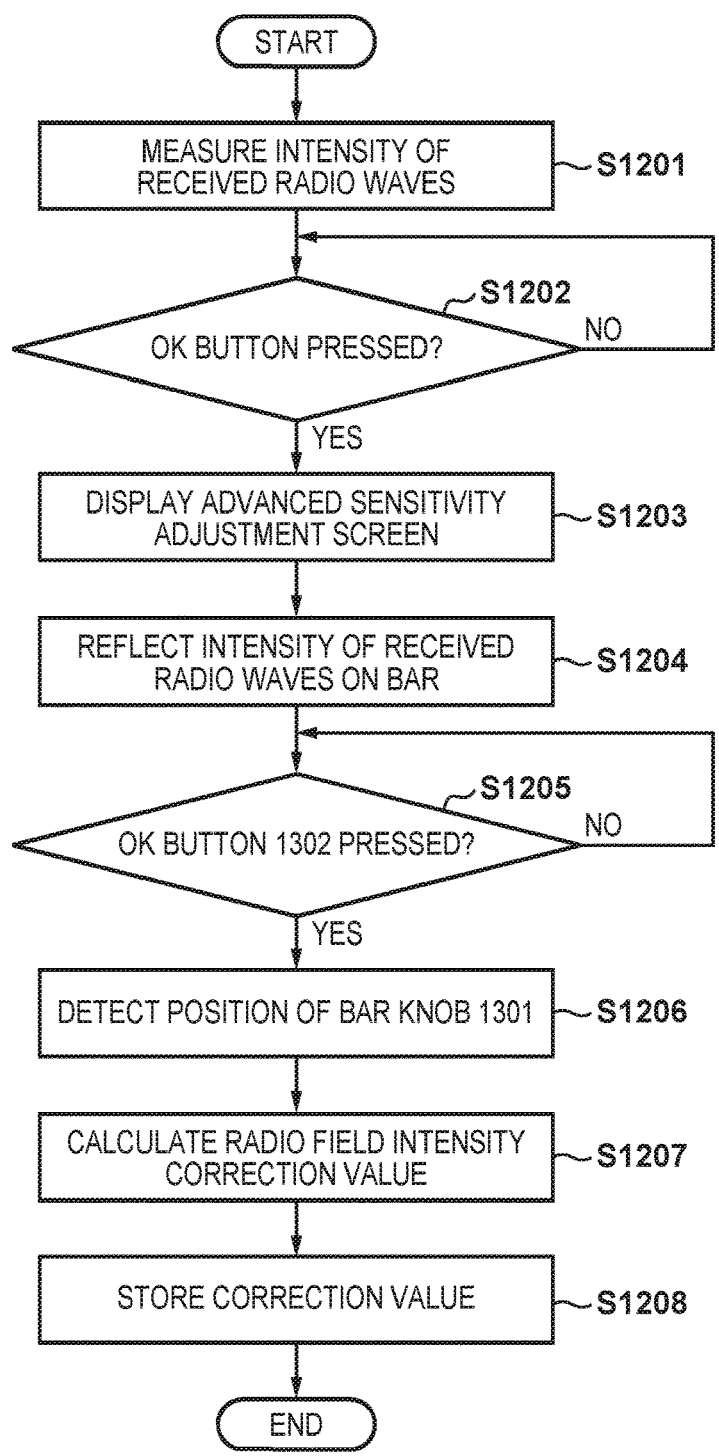
FIG. 12 is a flowchart for describing processing for performing sensitivity adjustment in a mobile terminal according to a second embodiment.

FIG. 12 is a flowchart for describing processing for performing sensitivity adjustment in the mobile terminal 110 according to the second embodiment. This processing is realized by the CPU 202 deploying a program stored in the ROM 204 to the RAM 206 and executing the program.

In step S1201, the CPU 202 measures the radio field intensity of a BLE advertising packet that was received by the Bluetooth communication unit 216. The CPU 202 then stores the content of the received packet in the RAM 206. In the second embodiment, it is assumed that the radio field intensity is −38 dBm, and that the distance is 30 cm. Next, the procedure moves to step S1202, in which the CPU 202 determines whether or not the OK button 702 in the sensitivity adjustment screen (e.g., FIG. 7A) was pressed. The procedure moves to step S1203 if the OK button 702 was pressed, or moves to step S1202 if otherwise. In step S1203, the CPU 202 displays the advanced sensitivity adjustment screen shown in FIG. 13. The advanced sensitivity adjustment screen will be described below.

Figure 13:
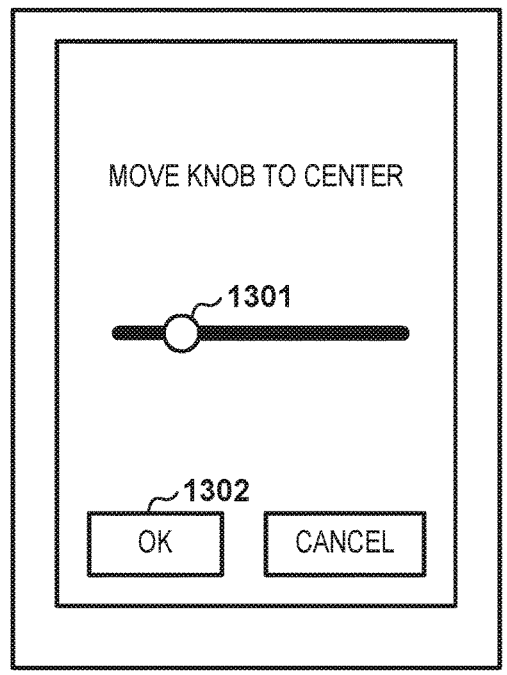
FIG. 13 depicts a view showing an example of an advanced sensitivity adjustment screen that is displayed on the operation unit of the mobile terminal according to the second embodiment.

FIG. 13 depicts a view showing an example of an advanced sensitivity adjustment screen that is displayed on the operation unit 212 of the mobile terminal 110 according to the second embodiment.

A slide bar knob 1301 can slide to the left and right, and represents how high or low the radio field intensity of radio waves received at a specific distance is. For example, as shown in FIG. 13, if the knob 1301 is to the left of the bar center, it shows that the radio field intensity is lower than standard. The slide bar in FIG. 13 is an example of an adjustment object for deciding the radio field intensity correction amount.

In step S1204, the CPU 202 reflects the radio field intensity of the BLE advertising packet received in step S1201 in the position of the slide bar knob 1301. For example, in the case of calculating a correction value for the radio field intensity at 30 cm as in the second embodiment, the radio field intensity can be represented by the position of the slide bar knob 1301 on a bar whose center is −46 dBm, left end is −66 dBm, and right end is −26 dBm. In the second embodiment, a radio field intensity of −38 dBm is 8 dBm higher than the reference radio field intensity of −46 dBm in the case where the distance is 30 cm (see FIG. 10). Accordingly, the knob 1301 is located to the right of the slide bar center in this case.

Next, the procedure moves to step S1205, in which the CPU 202 determines whether or not an OK button 1302 in the advanced sensitivity adjustment screen in FIG. 13 is pressed. The procedures moves to step S1206 if it is determined that the OK button 1302 was pressed, or moves to step S1205 if otherwise. In step S1206, the CPU 202 detects the position of the slide bar knob 1301, and calculates what dBm to set as a provisional radio field intensity for the intensity of received radio waves. For example, in the second embodiment, if the user moves the slide bar knob 1301 to the bar center and then presses the OK button 1302, the provisional radio field intensity is set to −46 dBm.

Next, the procedure moves to step S1207, in which the CPU 202 calculates a radio field intensity correction value from the difference between the intensity of radio waves received in step S1201 (−38 dBm in the above-described example) and the provisional radio field intensity obtained in step S1206. Here, if the position of the slide bar knob 1301 is at the bar center, that is to say if the user desires to perform correction with a distance of approximately 30 cm between the mobile terminal 110 and the image forming apparatus 100, the obtained correction value is (−46 dBm)−(−38 dBm)=(−8 dBm). The procedure then moves to step S1208, in which the CPU 202 stores the correction value calculated in step S1207 in the RAM 206, and then ends this processing.

Note that in step S1208, if the model or the like of the target image forming apparatus has been identified, the previously described correction value may be stored in association with the model information of the target image forming apparatus.

As described above, the second embodiment has an effect of allowing the user to easily select whether or not to perform correction when the mobile terminal 110 calculates a correction value, and select the extent of the correction.

Third Embodiment

Figure 14:
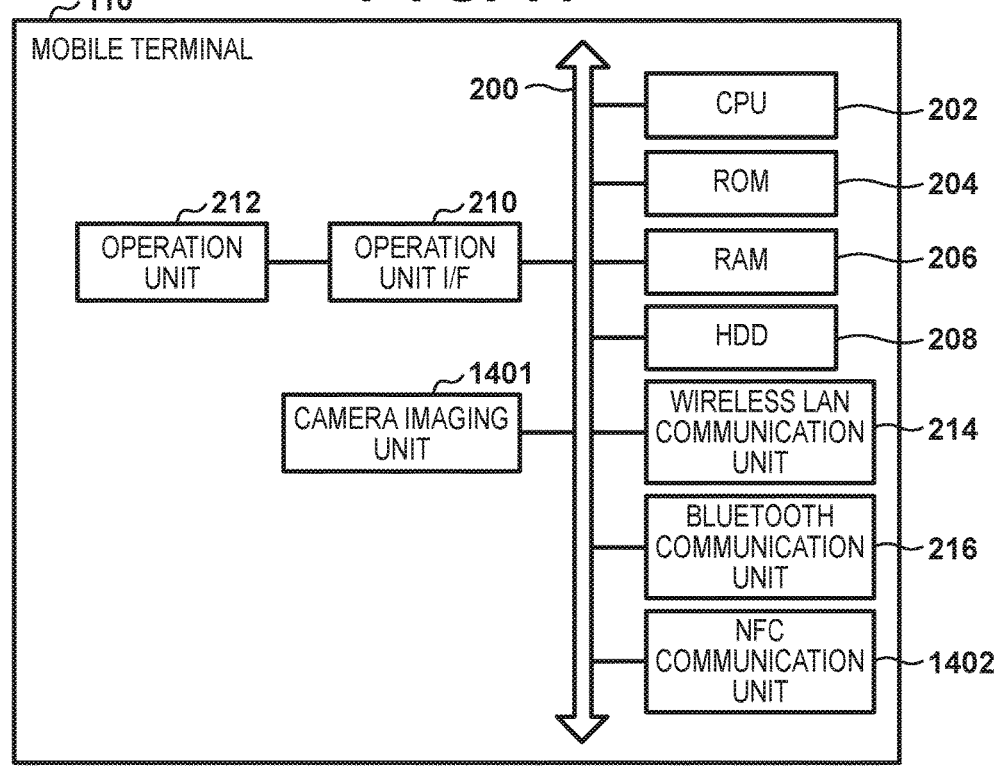
FIG. 14 is a block diagram for describing a configuration of main portions of a mobile terminal according to a third embodiment of the present invention.

FIG. 14 is a block diagram for describing the configuration of main portions of the mobile terminal 110 according to a third embodiment of the present invention. Note that portions that are the same as in FIG. 2 are denoted by the same reference numbers and will not be described.

A camera imaging unit 1401 captures an image using a camera function and generates image data. An NFC communication unit 1402 executes wireless communication by NFC (Near Field Communication) with an external apparatus such as the image forming apparatus 100.

In the third embodiment, the mobile terminal 110 calculates a radio field intensity correction value based on wireless communication radio waves transmitted from the image forming apparatus 100. Thereafter, in order to identify the distance to the image forming apparatus 100 at the location to where the mobile terminal 110 moved, the radio field intensity of radio waves received at that location is corrected, and the distance is calculated using the corrected radio field intensity. The distance obtained in this way is used in various services (functions) that utilize distance information and are presented as a piece of application software (not shown) or the like installed in the mobile terminal 110.

Figure 15:
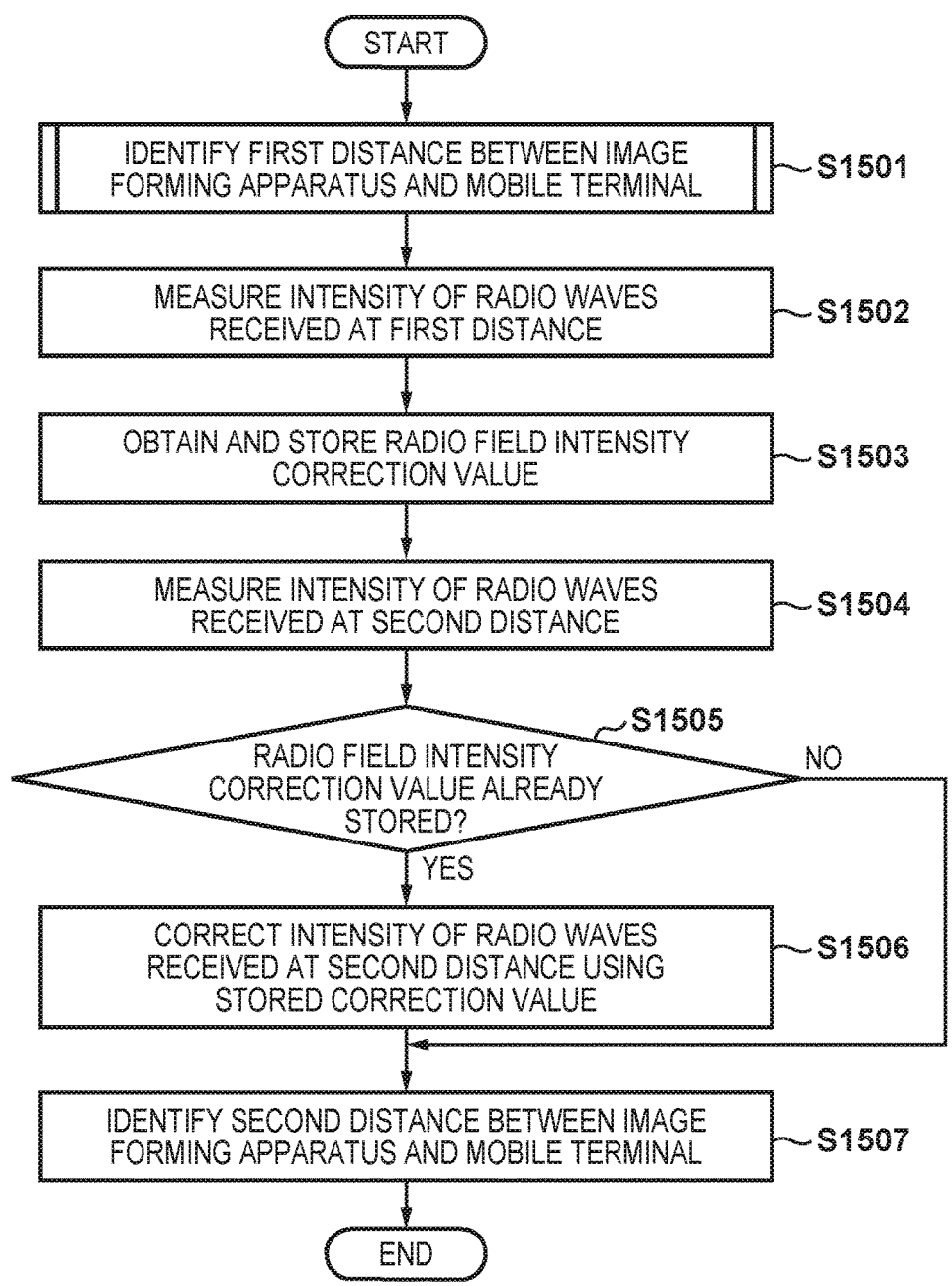
FIG. 15 is a flowchart for describing processing in which the mobile terminal according to the third embodiment identifies the distance to an image forming apparatus.

FIG. 15 is a flowchart for describing processing in which the mobile terminal 110 according to the third embodiment corrects a radio field intensity and identifies the distance to an image forming apparatus. This processing is realized by the CPU 202 deploying a program stored in the ROM 204 to the RAM 206 and executing the program.

In step S1501, the CPU 202 identifies a first distance between the image forming apparatus 100 and the mobile terminal 110, and then moves to step S1502.

Figure 16:
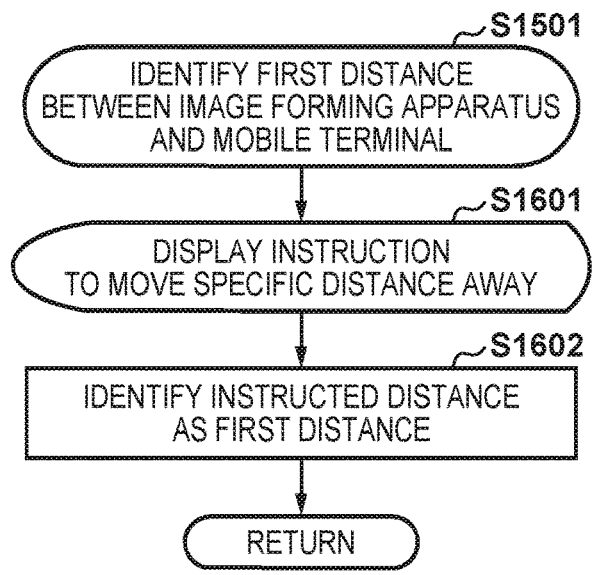
FIG. 16 is a flowchart for describing processing in step S1501 of FIG. 15.

FIG. 16 is a flowchart for describing processing in step S1501 of FIG. 15.

In step S1601, the CPU 202 displays, on the operation unit 212 of the mobile terminal 11 via the operation unit I/F 210, a message screen including an instruction to move to a specific distance.

Figure 17:
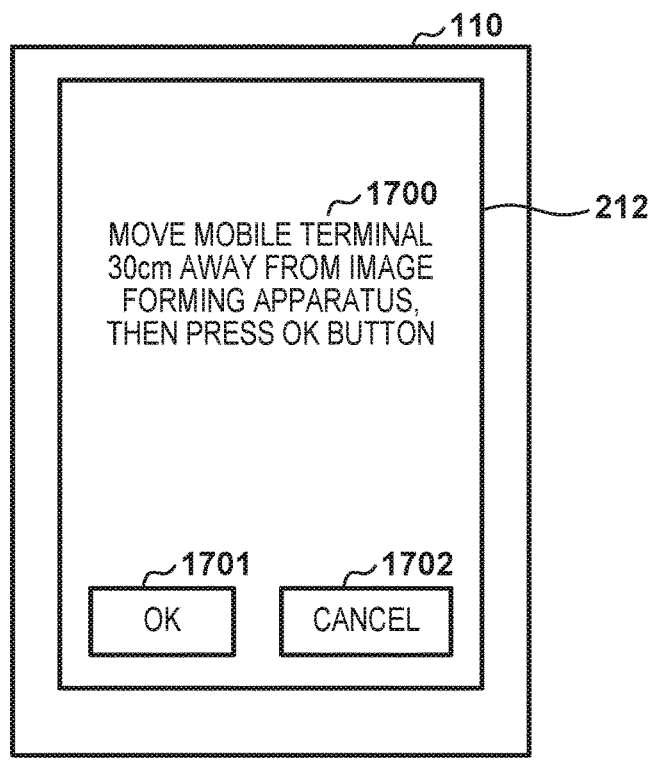
FIG. 17 depicts a view showing an example of a message screen that is displayed on the operation unit of the mobile terminal according to the third embodiment.

FIG. 17 depicts a view showing an example of a message screen that is displayed on the operation unit 212 of the mobile terminal 110 according to the third embodiment.

Here, reference numeral 1700 denotes a message displayed on the operation unit 212. The user is instructed to move to a distance of 30 cm from the image forming apparatus. The instruction to move 30 cm away here is merely one example, and another distance may be used. If the user moves to a distance of 30 cm from the image forming apparatus as instructed and then presses an OK button 1701, 30 cm is identified as the distance between the mobile terminal 110 and the image forming apparatus. If a cancel button 1702 is pressed, processing for identifying the first distance is canceled.

In this way, if the OK button 1701 is pressed in step S1601 of FIG. 16, the procedure moves to step S1602, in which the CPU 202 identifies 30 cm as the first distance and then ends this processing. In other words, the fact that the user pressed the OK button 1701 is recognized via the operation unit I/F 210, and 30 cm is stored in the RAM 206 as the first distance.

Next, the procedure moves to step S1502 in FIG. 15, in which the CPU 202 measures the intensity of the radio waves received at the first distance (30 cm). Similarly to the case in FIG. 9, assume here that the radio field intensity is −38 dBm. At this time, the CPU 202 receives, via the Bluetooth communication unit 216, a BLE advertising packet transmitted by the image forming apparatus 100, and measures the radio field intensity of the received packet. The content of the received packet is also stored in the RAM 206. Here, the examples of the distance between the mobile terminal 110 and the image forming apparatus 100 and the radio field intensity are assumed to be the same as in FIGS. 9 and 10 described above. The procedure then moves to step S1503, in which the CPU 202 obtains a correction value (−8 dBm in this case) and stores it in the RAM 206 similarly to the first embodiment described above.

Note that a configuration is possible in which the magnitude of the radio field intensity is determined, and certain correction amounts are calculated based on the determined magnitude information. For example, the radio field intensity is classified into three stages, namely low, medium, and high. The reference value of the radio field intensity at 30 cm is −46 dBm, and therefore the magnitude is low when less than −51 dBm, medium when −51 dBm to −41 dBm, and high when greater than −41 dBm. Also, the correction value here is +5 dBm for low, 0 dBm (no correction) for medium, and −5 dBm for high. The intensity of the received radio waves in this example is −38 dBm, and therefore the radio field intensity is classified as "high", and the correction value is −5 dBm. Although the above describes an example of three radio field intensity stages and the above-described correction value ranges, the present invention is not limited to this example. The radio field intensity may be classified into five stages, and the correction value ranges may be different.

Next, the procedure moves to step S1504, in which the CPU 202 measures the intensity of the radio waves received at the second distance, and then moves to step S1505. As previously described, this processing is executed in the case where the distance between the mobile terminal 110 and the image forming apparatus 100 needs to be measured. The mobile terminal 110 receives, via the Bluetooth communication unit 216, a BLE advertising packet transmitted by the image forming apparatus 100, and measures the radio field intensity. The content of the received packet is also stored in the RAM 206. The description will be continued based on the premise that the radio field intensity at the second distance is −47 dBm.

In step S1505, the CPU 202 determines whether or not a radio field intensity correction value is stored in the RAM 206. The procedure moves to step S1506 if it is determined that a correction value is stored, or moves to step S1507 if otherwise.

In the third embodiment, a correction value has been obtained in step S1504 and stored in the RAM 206, and therefore the procedure moves from step S1505 to step S1506. Examples of cases where a correction value is not stored include the case where a correction value has not been obtained in advance, and the case where a correction value is not stored due to a failure in correction value obtainment. In step S1506, the CPU 202 corrects the intensity of the radio waves received at the second distance with use of the stored correction value, and then moves to step S1507. Assume that the intensity of the radio waves received at the second distance is −47 dBm, for example, in step S1506. Accordingly, in this case, the radio field intensity of the radio waves received in step S1502 is −47 dBm, and the correction value calculated in step S1503 is −8 dBm, and therefore the corrected radio field intensity is (−47 dBm)+(−8 dBm)=(−55 dBm).

In step S1507, the CPU 202 identifies the distance between the image forming apparatus 100 and the mobile terminal 110, and then ends this processing. Here, the corrected radio field intensity obtained in step S1506 is −55 dBm, and therefore based on the relationship between radio field intensity and the reference distance in FIG. 10, the distance between the image forming apparatus 100 and the mobile terminal 110 is approximately 1 m. However, if it is determined in step S1505 that a correction value is not stored, the intensity of the radio waves received in step S1504 is −47 dBm, and therefore the distance between the image forming apparatus 100 and the mobile terminal 110 is approximately 0.33 m, and an error of approximately 0.67 m arises.

Note that although a specific distance such as approximately 1 m is calculated in S1507 in the third embodiment, the distance may be identified as a certain range of distances, such as 90 cm to 110 cm.

As described above, according to the third embodiment, the user of the mobile terminal is instructed to move to a first distance away from the image forming apparatus, the intensity of radio waves received from the image forming apparatus is measured, and a correction value is obtained for correcting the measured intensity based on the designated first distance. The intensity of radio waves received at a second distance from the image forming apparatus is then corrected using the correction value, and thus the second distance can be accurately obtained based on the corrected radio field intensity.

Fourth Embodiment

Next, a fourth embodiment of the present invention will be described. Note that the system configuration and the configurations of the image forming apparatus and the mobile terminal in the fourth embodiment are similar to the configurations of the first embodiment described above, and therefore will not be described.

Figure 18:
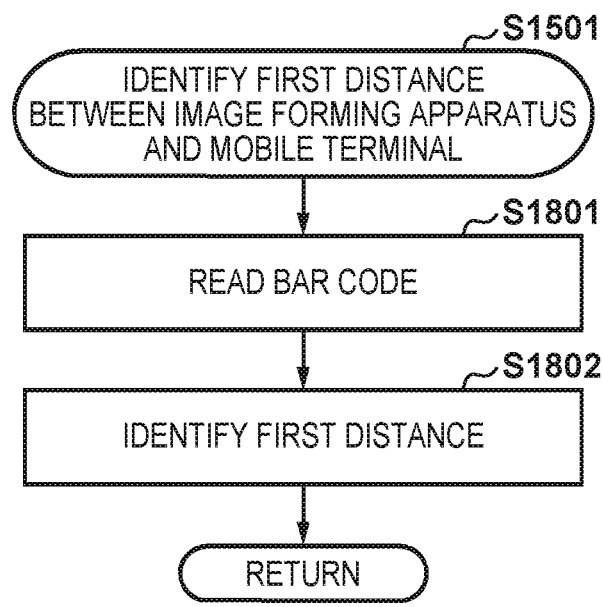
FIG. 18 is a flowchart for describing processing in which a mobile terminal according to a fourth embodiment identifies a first distance in the processing in step S1501 of FIG. 15.

FIG. 18 is a flowchart for describing processing in which the mobile terminal 110 according to the fourth embodiment identifies a first distance in the processing in step S1501 of FIG. 15.

In step S1801, the CPU 202 causes the camera imaging unit 1401 to capture an image of a bar code (not shown) displayed on the console unit 312 of the image forming apparatus 100, and then the procedure moves to step S1802. Here, the bar code may be a one-dimensional bar code or a two-dimensional bar code.

Figure 19:
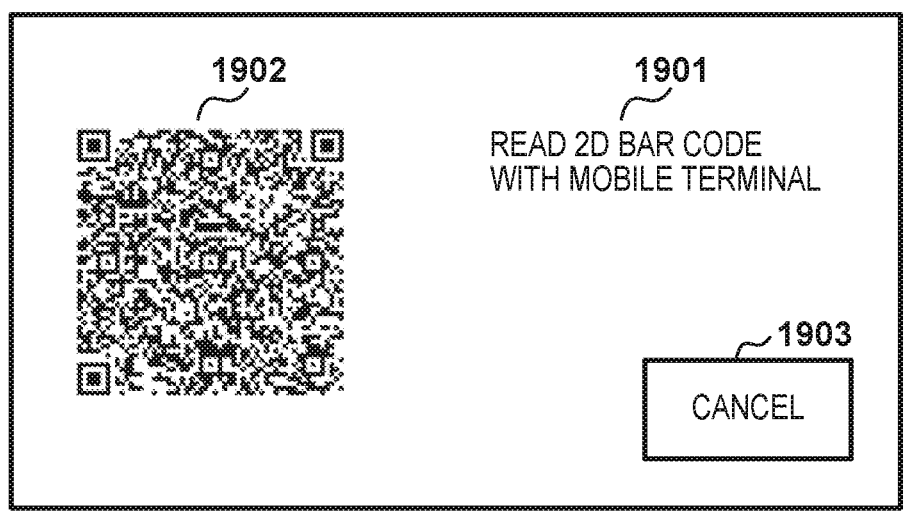
FIG. 19 depicts a view showing an example of a screen that is displayed on the console unit of an image forming apparatus according to the fourth embodiment and displays a two-dimensional bar code and a message.

FIG. 19 depicts a view showing an example of a screen that is displayed on the console unit 312 of the image forming apparatus 100 according to the fourth embodiment and displays a two-dimensional bar code and a message.

A message 1901 is a message giving an instruction to use the mobile terminal 110 to read a two-dimensional bar code 1902 displayed on the console unit 312 of the image forming apparatus 100. If a cancel button 1903 is pressed, bar code reading processing is canceled.

Figure 20:
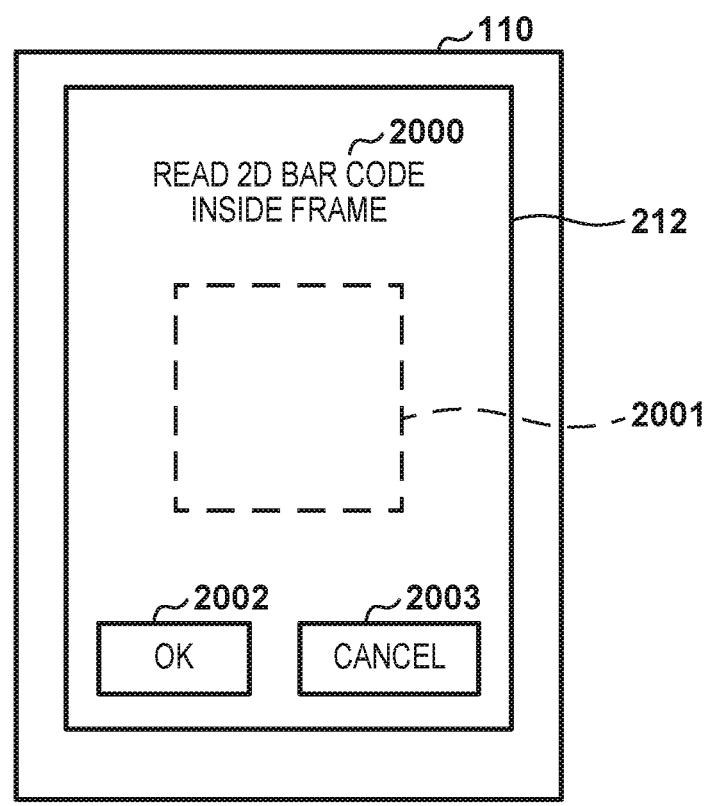
FIG. 20 depicts a view showing an example of a two-dimensional bar code reading screen that is displayed on the operation unit of the mobile terminal according to the fourth embodiment.

FIG. 20 depicts a view showing an example of a two-dimensional bar code reading screen that is displayed on the operation unit 212 of the mobile terminal 110 according to the fourth embodiment.

A message 2000 instructs the user to read the two-dimensional bar code in an area indicated by a frame 2001. The frame 2001 shows a region for reading a two-dimensional bar code. If an OK button 2002 is pressed, an image of the bar code is captured by operating the shutter of the camera function of the camera imaging unit 1401, and the bar code is recognized based on the captured image data. In this case, if the mobile terminal 110 includes a function for automatically recognizing the screen, the bar code may be automatically recognized in the region without the OK button 2002 being pressed. If a cancel button 2003 is pressed, bar code reading processing is canceled. The screen displayed on the operation unit 212 is transferred to the CPU 202 via the operation unit I/F 210, and it is determined whether or not a bar code can be recognized.

In step S1802, the CPU 202 identifies the first distance based on the bar code that was read in step S1801, and then ends this processing. Note that the distance at which the two-dimensional bar code 1902 can be correctly read is approximately 30 cm, and therefore it is determined that the first distance is 30 cm if the reading of the two-dimensional bar code 1902 is successful.

Note that if the two-dimensional bar code is read while completely filling the region indicated by the frame 2001, the distance is more accurately determined to be near 30 cm.

Also, if the two-dimensional bar code 1902 is read while being tilted or is read in a region smaller than the frame 2001, the angle and position of the mobile terminal 110 is calculated based on the shape of the read two-dimensional bar code, thus making it possible to obtain a more accurate distance. For example, if the size of the two-dimensional bar code displayed on the console unit 312 of the image forming apparatus 100 is 5 cm, and the size of the two-dimensional bar code read by the mobile terminal 110 is 5 cm, the first distance is assumed to be 30 cm. If the size of the two-dimensional bar code read by the mobile terminal 110 is 3 cm, the actual distance is obtained as 30×5/3=50 cm based on the ratio of the sizes.

As described above, according to the fourth embodiment, by merely reading a bar code displayed on the image forming apparatus using the mobile terminal, it is possible to identify the distance between the image forming apparatus and the mobile terminal.

Fifth Embodiment

Next, a fifth embodiment of the present invention will be described. Note that the system configuration and the configurations of the image forming apparatus and the mobile terminal in the fifth embodiment are similar to the configurations of the first embodiment described above, and therefore will not be described.

Figure 21:
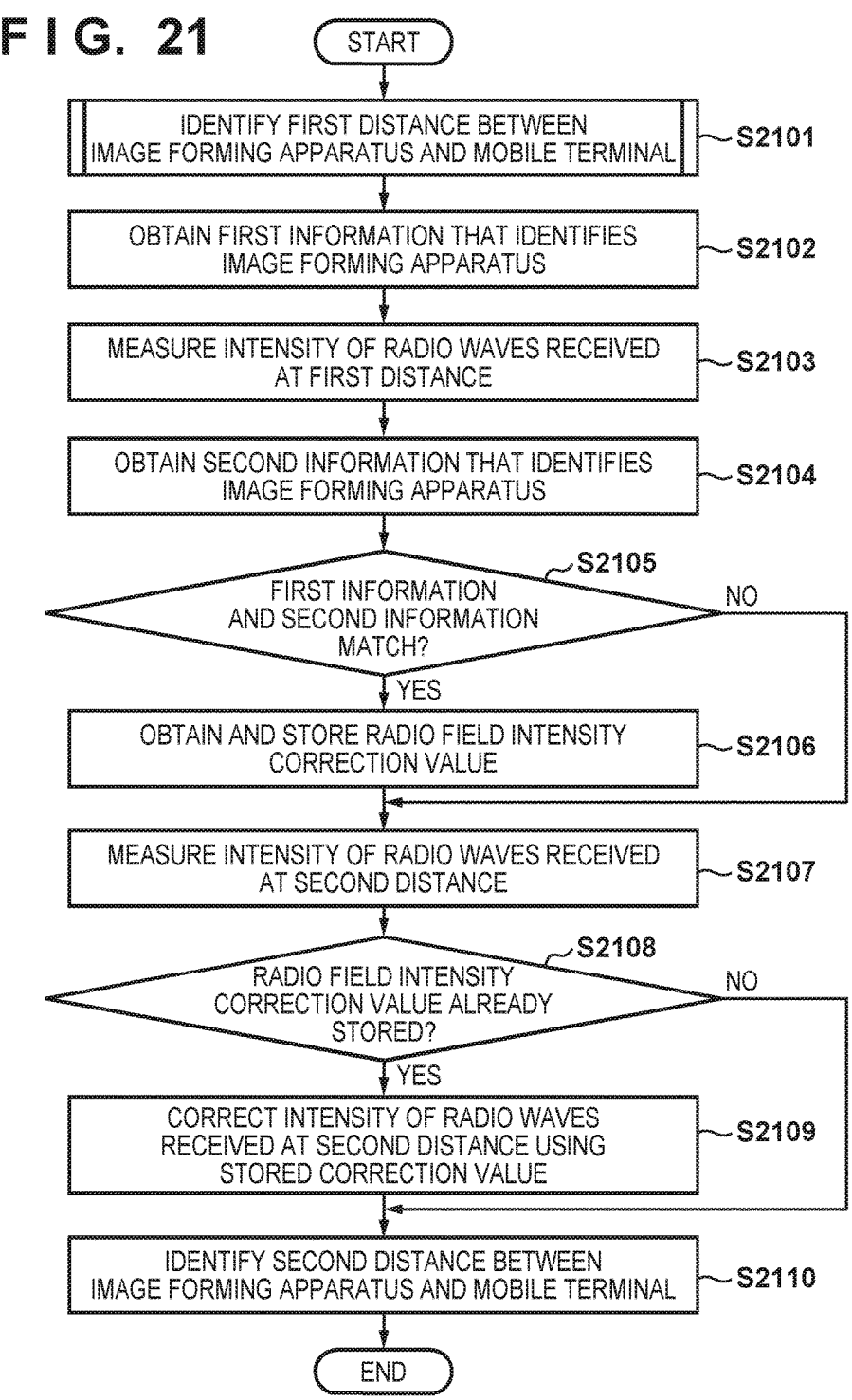
FIG. 21 is a flowchart for describing processing in which a mobile terminal according to a fifth embodiment identifies the distance to an image forming apparatus.

FIG. 21 is a flowchart for describing processing in which the mobile terminal 110 according to the fifth embodiment identifies the distance to an image forming apparatus. This processing is realized by the CPU 202 deploying a program stored in the ROM 204 to the RAM 206 and executing the program. Note that in FIG. 21, steps S2101, S2103, and S2106 to S2110 are the same as steps S1501, S1502, and S1503 to S1507 in FIG. 15 described above, and descriptions will not be given for them.

In step S2102, the CPU 202 obtains first information that identifies the image forming apparatus 100, and then the procedure moves to step S2103. Various information is embedded in the two-dimensional bar code 1902, and therefore the first information is obtained by reading and analyzing the two-dimensional bar code 1902 displayed on the console unit 312 of the image forming apparatus 100.

Figure 22:
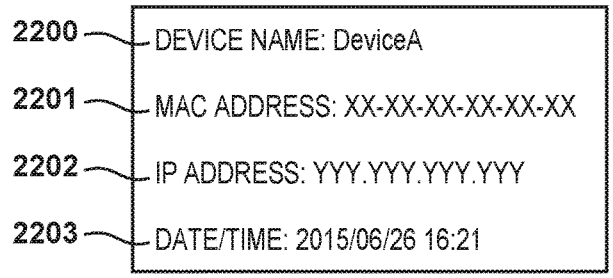
FIG. 22 is a diagram for describing an example of information included in a two-dimensional bar code according to the fifth embodiment.

FIG. 22 depicts a view showing an example of information included in the two-dimensional bar code according to the fifth embodiment.

A device name 2200 indicates that the name of the image forming apparatus 100 is "DeviceA". A MAC address 2201 indicates that the MAC address of the image forming apparatus 100 is "XX-XX-XX-XX-XX-XX". An IP address 2202 indicates that the IP address of the image forming apparatus 100 is "YYY.YYY.YYY.YYY". A date/time 2203 indicates that the corresponding date/time is "2015/06/26 16:21". It is sufficient that the first information includes information capable of identifying the image forming apparatus 100, and therefore the present invention is not particularly limited to the aforementioned pieces of information.

In step S2104, the CPU 202 obtains second information that identifies the image forming apparatus 100, and then the procedure moves to step S2105. By including information for identifying the image forming apparatus 100 in the BLE advertising packet transmitted by the image forming apparatus 100, the second information can be obtained in step S2103 by analyzing a received advertising packet. For example, information such as the MAC address "XX-XX-XX-XX-XX-XX" and the IP address "YYY.YYY.YYY.YYY" is obtained.

Next, the procedure moves to step S2105, in which the CPU 202 determines whether or not the first information and the second information match each other. The procedure moves to step S2106 if it is determined that the first and second information match each other, or moves to step S2107 if otherwise.

In the fifth embodiment, the first information obtained from the two-dimensional bar code 1902 in step S2102 and the second information obtained from the received packet for example in step S2104 match each other, and therefore the procedure moves to step S2106. By confirming that these pieces of information match each other, it is possible to identify the image forming apparatus 110 for which a correction value is to be obtained.

Note that in the case where the first information and the second information match each other, if a correction value is calculated and stored in the RAM 206 in association with information identifying the image forming apparatus, it is possible to store correction values for multiple image forming apparatuses.

Also, the fifth embodiment describes an example in which processing for obtaining a radio field intensity correction value in step S2106 is skipped if it is determined that the first and second information do not match each other in step S2105, but a configuration is possible in which this determination is not made, and a correction value is obtained without being associated with the image forming apparatus 100.

As described above, according to the fifth embodiment, if identification information of an image forming apparatus included in a two-dimensional bar code displayed on the image forming apparatus matches identification information of the image forming apparatus included in a packet received from the image forming apparatus, a correction value is obtained for that image forming apparatus. Accordingly, a correction value for correcting the intensity of radio waves received from the image forming apparatus can be stored in association with identification information that identifies the image forming apparatus, thus making it possible to correct the distance to the image forming apparatus with use of a correction value that corresponds to that image forming apparatus.

Sixth Embodiment

Next, a sixth embodiment of the present invention will be described. Note that the system configuration and the configurations of the image forming apparatus and the mobile terminal in the sixth embodiment are similar to the configurations of the first embodiment described above, and therefore will not be described. In the sixth embodiment, the mobile terminal 110 obtains a radio field intensity correction value based on wireless communication radio waves transmitted from the image forming apparatus 100. Thereafter, in order to identify the distance to the image forming apparatus 100 at the location to where the mobile terminal 110 moved, the intensity of radio waves received at the location is corrected based on the correction value, and the distance is calculated based on the corrected radio field intensity. This is because when running various services (functions) that utilize distance information and are presented as a piece of application software (not shown) or the like installed in the mobile terminal 110, there are cases where it is necessary to measure the distance between the mobile terminal 110 and the image forming apparatus 100. The following description will be given taking the example of the above-described configuration.

Figure 23:
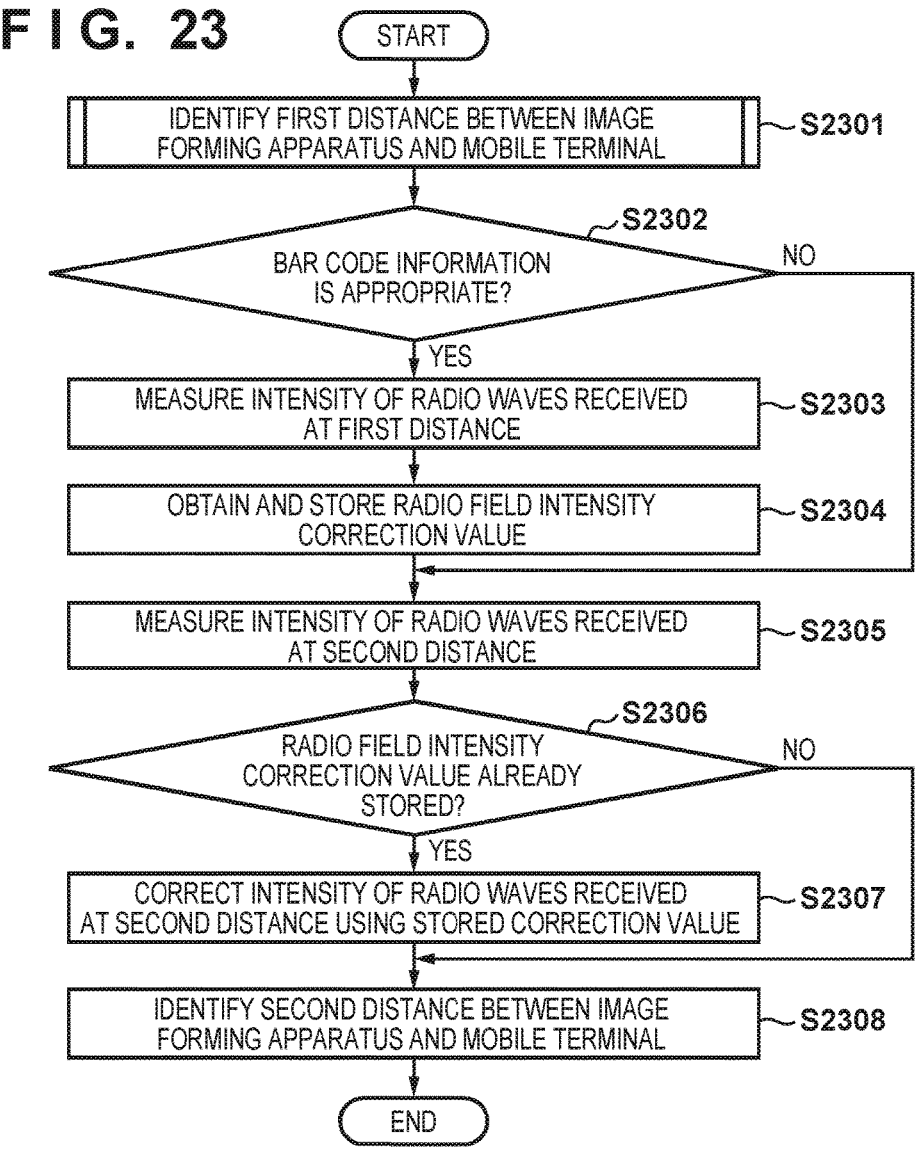
FIG. 23 is a flowchart for describing processing in which a mobile terminal according to a sixth embodiment identifies the distance to an image forming apparatus.

FIG. 23 is a flowchart for describing processing in which the mobile terminal 110 according to the sixth embodiment identifies the distance to an image forming apparatus. This processing is realized by the CPU 202 deploying a program stored in the ROM 204 to the RAM 206 and executing the program. Note that the processing of steps S2301 and S2303 to S2308 is the same as the processing of steps S1501 and S1502 to S1507 in FIG. 15, and therefore descriptions will not be given for them. In step S2302, the CPU 202 determines whether or not information in the two-dimensional bar code 1902 displayed on the console unit 312 of the image forming apparatus 100 is appropriate. The procedure moves to step S2303 if it is determined that the information is appropriate, or moves to step S2305 if otherwise.

In the sixth embodiment, date information included in the two-dimensional bar code 1902 is used to determine whether or not the information of the two-dimensional bar code is appropriate. As illustrated in FIG. 22, a date/time 2203 is included in the two-dimensional bar code 1902. It is determined whether or not a difference between the date/time 2203 and the current date/time, for example, is within a predetermined range. The phrase "within a predetermined range" refers to the time difference being within three minutes, for example. The above example is not intended to limit the present invention, and the time difference may be within 10 minutes for example.

According to the sixth embodiment, it is ensured that the image of the bar code displayed on the image forming apparatus 100 was captured at the current time. For example, consider the case where an image of the two-dimensional bar code 1902 displayed on the image forming apparatus 100 was captured several days ago and stored, and the information in the stored bar code is used. In this case, the difference from the current date/time is greater than or equal to a predetermined time (e.g., three minutes), and therefore it is determined that the information in the stored bar code is not appropriate.

As described above, according to the sixth embodiment, an image forming apparatus is identified based on information included in an up-to-date two-dimensional bar code displayed on the image forming apparatus, and a correction value for that image forming apparatus is obtained. Accordingly, a correction value for correcting the intensity of radio waves received from the image forming apparatus can be stored in association with identification information that identifies the image forming apparatus, thus making it possible to correct the distance to the image forming apparatus with use of a correction value that corresponds to the image forming apparatus.

Seventh Embodiment

Next, a seventh embodiment of the present invention will be described. Note that the system configuration and the configurations of the image forming apparatus and the mobile terminal in the seventh embodiment are similar to the configurations of the first embodiment described above, and therefore will not be described.

FIG. 24 is a flowchart for describing processing in which the mobile terminal 110 according to the seventh embodiment identifies a first distance in step S1501 of FIG. 15 described above. Note that this processing corresponds to step S2101 in FIG. 21 and step S2301 in FIG. 23.

In step S2401, the CPU 202 executes short-range wireless communication, and then the procedure moves to step S2402. NFC (Near Field Communication) or the like is used as the short-range wireless communication. Here, when the user of the mobile terminal 110 taps the mobile terminal 110 against an NFC reading apparatus provided in the image forming apparatus 100, NFC communication is carried out by the NFC communication unit 1402. In step S2402, the CPU 202 identifies a first distance, and then ends this processing. The NFC reading apparatus is attached to the image forming apparatus 100, and therefore 10 cm, for example, can be identified as the first distance.

As described above, according to the seventh embodiment, the mobile terminal can identify the distance to the image forming apparatus by performing short-range wireless communication. Other effects are similar to those of the embodiments described above.

Eighth Embodiment

Next, an eighth embodiment of the present invention will be described. Note that the system configuration and the configurations of the image forming apparatus and the mobile terminal in the eighth embodiment are similar to the configurations of the first embodiment described above, and therefore will not be described.

FIG. 25 is a flowchart for describing processing in which the mobile terminal 110 according to the eighth embodiment identifies a first distance in step S1501 of FIG. 15 described above. Note that this processing corresponds to step S2101 in FIG. 21 and step S2301 in FIG. 23.

In step S2501, the CPU 202 causes the camera imaging unit 1401 to capture an image of the image forming apparatus 100 and obtain image data, and then the procedure moves to step S2502. In step S2502, the CPU 202 identifies a first distance, and then ends this processing. Here, first, information indicating the shape of the image forming apparatus 100 is read out from the RAM 206. This information may be stored in the RAM 206 in advance, may be stored in the ROM 204, or may be obtained from an external source via the wireless LAN communication unit 214 or the like. The first distance is identified by performing a size and angle comparison or the like based on the shape information of the image forming apparatus 100 and the shape of the image forming apparatus 100 imaged by the mobile terminal 110.

As described above, according to the eighth embodiment, the mobile terminal can identify the distance to the image forming apparatus based on an image of the image forming apparatus captured by the mobile terminal. Other effects are similar to those of the embodiments described above.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-008288, filed Jan. 19, 2016, which is hereby incorporated by reference herein in its entirety.

What is claimed is:

1. A method of adjusting a sensitivity for a radio field intensity of a Bluetooth LE (Bluetooth Low Energy) packet received by a communication terminal, the method comprising:
displaying a first screen related to an adjustment of the sensitivity for the radio field intensity of the Bluetooth LE packet; and
in accordance with receiving a predetermined user's instruction via the first screen, adjusting the sensitivity for the radio field intensity of the Bluetooth LE packet based on at least the radio field intensity of the Bluetooth LE packet received by the communication terminal.

2. The method according to claim 1, wherein, in the adjusting, the sensitivity is adjusted based on the radio field intensity of the Bluetooth LE packet received by the communication terminal and a reference value that is stored in advance.

3. The method according to claim 1, wherein the Bluetooth LE packet is transmitted by an image processing apparatus, and
the method further comprising displaying a message prompting a user to bring the communication terminal near the image processing apparatus on the first screen.

4. The method according to claim 1, wherein the Bluetooth LE packet is transmitted by an image processing apparatus, and
the method further comprising displaying a positional relationship between the image processing apparatus and the communication terminal that is suitable for adjusting the sensitivity for the radio field intensity of the Bluetooth LE packet on the first screen with use of an image that corresponds to a model of the image processing apparatus.

5. The method according to claim 1, wherein the Bluetooth LE packet is transmitted by an image processing apparatus, and
the method further comprising:
displaying a second screen including a list of image processing apparatuses in a periphery of the communication terminal based on the Bluetooth LE packet;
in a case that a user selects an image processing apparatus from among the image processing apparatuses in the list displayed on the second screen, determining whether or not the sensitivity for the radio field intensity of the Bluetooth LE packet has been adjusted, and in a case that it is determined that the sensitivity for the radio field intensity of the Bluetooth LE packet has not been adjusted, displaying the first screen.

6. The method according to claim 5, wherein in a case that it is determined that the sensitivity for the radio field intensity of the Bluetooth LE packet has been adjusted, the first screen is not displayed, and a Wi-Fi connection is established between the communication terminal and the image processing apparatus selected by the user.

7. The method according to claim 1, wherein the Bluetooth LE packet is transmitted by a printing apparatus.

8. The method according to claim 7, further comprising transmitting data to the printing apparatus in a wireless communication being compliant with the Bluetooth LE in accordance with at least the sensitivity having adjusted and the radio field intensity of an advertising packet received from the printing apparatus being greater than a predetermined intensity the radio field intensity that was corrected in step S1103 is greater than or equal to a predetermined threshold value).

9. The method according to claim 8, wherein, in the wireless communication being compliant with the Bluetooth LE, data for activating process for performing a user to automatically login the printing apparatus is transmitted.

10. The method according to claim 8, wherein the wireless communication being compliant with the Bluetooth LE is GATT (Generic Attributes) communication.

11. A non-transitory computer readable storage medium storing a program for causing a computer to perform adjusting a sensitivity for a radio field intensity of a Bluetooth LE (Bluetooth Low Energy) packet received by a communication terminal, the program comprising:
code for displaying a first screen related to adjustment of the sensitivity for the radio field intensity; and
code for, in accordance with receiving a predetermined user's instruction via the first screen, adjusting the sensitivity for the radio field intensity of the Bluetooth LE packet based on at least the radio field intensity of the Bluetooth LE received by the communication terminal.

12. The non-transitory computer readable storage medium according to claim 11, wherein, in the adjusting, the sensitivity is adjusted based on the radio field intensity of the Bluetooth LE packet received by the communication terminal and a reference value that is stored in advance.

13. The non-transitory computer readable storage medium according to claim 11, wherein the Bluetooth LE packet is transmitted by an image processing apparatus, and
the program further comprising code for displaying a message prompting a user to bring the communication terminal near the image processing apparatus on the first screen.

14. The non-transitory computer readable storage medium according to claim 11, wherein the Bluetooth LE packet is transmitted by an image processing apparatus, and
the program further comprising code for displaying a positional relationship between the image processing apparatus and the communication terminal that is suitable for adjusting the sensitivity for the radio field intensity of the Bluetooth LE packet on the first screen with use of an image that corresponds to a model of the image processing apparatus.

15. The non-transitory computer readable storage medium according to claim 11, wherein the Bluetooth LE packet is transmitted by an image processing apparatus, and the program further comprising:

code for displaying a second screen including a list of image processing apparatuses in a periphery of the communication terminal based on the Bluetooth LE packet;

code for, in a case that a user selects an image processing apparatus from among the image processing apparatuses in the list displayed on the second screen, determining whether or not the sensitivity for the radio field intensity of the Bluetooth LE packet has been adjusted; and code for, in a case that it is determined that the sensitivity for the radio field intensity of the Bluetooth LE packet has not been adjusted, displaying the first screen.

16. The non-transitory computer readable storage medium according to claim 15, wherein in a case that it is determined that the sensitivity for the radio field intensity of the Bluetooth LE packet has been adjusted, the first screen is not displayed, and a Wi-Fi connection is established between the communication terminal and the image processing apparatus selected by the user.

17. The non-transitory computer readable storage medium according to claim 11, wherein the Bluetooth LE packet is transmitted by a printing apparatus.

18. The non-transitory computer readable storage medium according to claim 17, the program further comprising:

code for transmitting data to the printing apparatus in a wireless communication being compliant with the Bluetooth LE in accordance with at least the sensitivity having adjusted and the radio field intensity of an advertising packet received from the printing apparatus being greater than a predetermined intensity.

19. The non-transitory computer readable storage medium according to claim 18, wherein, in the wireless communication being compliant with the Bluetooth LE, data for activating process for performing a user to automatically login the printing apparatus is transmitted.

20. The non-transitory computer readable storage medium according to claim 18, wherein the wireless communication being compliant with the Bluetooth LE is GATT (Generic Attributes) communication.

21. The non-transitory computer readable storage medium according to claim 11, wherein the communication terminal is a mobile terminal and the program is an application program that a processor of the mobile terminal is able to execute.

22. A method of adjusting a sensitivity for a radio field intensity of a Bluetooth LE (Bluetooth Low Energy) packet received by a communication terminal, the method comprising:

receiving the Bluetooth LE packet by the communication terminal that is located at a predetermined distance from an apparatus transmitting the Bluetooth LE packet; and adjusting the sensitivity for the radio filed intensity of the Bluetooth LE Packet based on the radio field intensity of the received Bluetooth LE packet.

23. A communication terminal for of adjusting a sensitivity for a radio field intensity of a received Bluetooth LE (Bluetooth Low Energy) packet, the communication terminal comprising:

a processor; and a memory that stores a program, wherein the processor executes the stored program to perform:

receiving the Bluetooth LE packet when the communication terminal is located at a predetermined distance from an apparatus that transmits the Bluetooth LE packet; and adjusting the sensitivity for the radio field intensity of the Bluetooth LE packet based on the radio field intensity of the Bluetooth LE packet received when the communication terminal is located at a predetermined distance from an apparatus transmitting the Bluetooth LE packet.

24. A non-transitory computer readable storage medium storing a program for causing a computer to perform:

receiving a Bluetooth LE (Bluetooth Low Energy) packet by the communication terminal when the communication terminal is located at a predetermined distance from an apparatus that transmits the Bluetooth LE packet; and adjusting the sensitivity for the radio field intensity of the Bluetooth LE packet based on the radio filed intensity of the Bluetooth LE packet received when the communication terminal is located at a predetermined distance from an apparatus transmitting the Bluetooth LE packet.

* * * * *